(12) United States Patent
Takii et al.

(10) Patent No.: US 11,014,575 B2
(45) Date of Patent: May 25, 2021

(54) VEHICULAR ILLUMINATION DEVICE, VEHICLE SYSTEM AND VEHICLE

(71) Applicant: KOITO MANUFACTURING CO., LTD., Tokyo (JP)

(72) Inventors: Naoki Takii, Shizuoka (JP); Naoki Tatara, Shizuoka (JP); Toshihiro Okamura, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 142 days.

(21) Appl. No.: 15/771,966

(22) PCT Filed: Oct. 26, 2016

(86) PCT No.: PCT/JP2016/081787
§ 371 (c)(1),
(2) Date: Apr. 27, 2018

(87) PCT Pub. No.: WO2017/073636
PCT Pub. Date: May 4, 2017

(65) Prior Publication Data
US 2018/0222492 A1    Aug. 9, 2018

(30) Foreign Application Priority Data

Oct. 27, 2015 (JP) ................................ 2015-211226
Oct. 27, 2015 (JP) ................................ 2015-211228
Oct. 27, 2015 (JP) .............................. JP2015-211227

(51) Int. Cl.
*B60W 50/14* (2020.01)
*B60Q 1/50* (2006.01)
(Continued)

(52) U.S. Cl.
CPC ............. *B60W 50/14* (2013.01); *B60K 35/00* (2013.01); *B60Q 1/00* (2013.01); *B60Q 1/50* (2013.01);
(Continued)

(58) Field of Classification Search
CPC .......... B60Q 1/00; F21S 41/675; F21S 41/16; B60K 2370/175; G01S 17/10; G01S 17/89; G01S 7/484
See application file for complete search history.

(56) References Cited

U.S. PATENT DOCUMENTS 8,346,426 B1    1/2013  Szybalski et al.
8,521,352 B1 *  8/2013  Ferguson ............. G05D 1/0274
                                               701/25
(Continued)

FOREIGN PATENT DOCUMENTS

CN    102216119 A    10/2011
CN    104787046 A     7/2015
(Continued)

OTHER PUBLICATIONS

Extended European Search Report issued in European Application No. 16859865.4, dated Jun. 25, 2019 (8 pages).
(Continued)

*Primary Examiner* — Mussa A Shaawat

(57) ABSTRACT

A vehicular illumination device provided to a vehicle capable of travelling in an automatic driving mode includes an illumination unit configured to display advance-notice information for giving advance-notice of automatic travelling control of the vehicle so that a passenger in the vehicle can visually recognize the advance-notice information, and an illumination controller configured to control the illumination unit so that the passenger in the vehicle can visually (Continued)

recognize the advance-notice information before the automatic traveling control of the vehicle is executed.

19 Claims, 12 Drawing Sheets

(51) Int. Cl.
*G02B 27/01* (2006.01)
*B60K 35/00* (2006.01)
*B60Q 1/00* (2006.01)
*F21S 41/675* (2018.01)
*F21S 41/16* (2018.01)

(52) U.S. Cl.
CPC ............ *F21S 41/16* (2018.01); *F21S 41/675* (2018.01); *G02B 27/0101* (2013.01); *B60K 2370/172* (2019.05); *B60K 2370/175* (2019.05); *B60K 2370/77* (2019.05); *B60Q 2400/50* (2013.01); *B60W 2050/146* (2013.01); *G02B 2027/0141* (2013.01)

(56) References Cited

U.S. PATENT DOCUMENTS

| | | | | |
|---|---|---|---|---|
| 9,063,334 | B2* | 6/2015 | Schulz | G02B 21/0032 |
| 9,233,645 | B2* | 1/2016 | Schofield | G02B 27/0101 |
| 9,843,777 | B2* | 12/2017 | Schofield | B60R 11/0247 |
| 2011/0187520 | A1 | 8/2011 | Filev et al. | |
| 2011/0187522 | A1 | 8/2011 | Filev et al. | |
| 2011/0193693 | A1 | 8/2011 | Filev et al. | |
| 2012/0249341 | A1* | 10/2012 | Brown | G08G 1/0104 |
| | | | | 340/902 |
| 2013/0261869 | A1* | 10/2013 | Brenneis | B60W 50/0205 |
| | | | | 701/23 |
| 2013/0265561 | A1* | 10/2013 | Takahira | F21V 9/20 |
| | | | | 356/3 |
| 2014/0056021 | A1* | 2/2014 | Takahira | F21S 41/285 |
| | | | | 362/551 |
| 2014/0109719 | A1 | 4/2014 | Lisseman et al. | |
| 2014/0214260 | A1 | 7/2014 | Eckert et al. | |
| 2014/0240691 | A1* | 8/2014 | Mheen | G01S 7/4815 |
| | | | | 356/4.07 |
| 2014/0244115 | A1 | 8/2014 | Sanma et al. | |
| 2015/0029581 | A1* | 1/2015 | Fan | H01S 3/1616 |
| | | | | 359/341.31 |
| 2015/0097866 | A1 | 4/2015 | Mochizuki et al. | |
| 2015/0203023 | A1 | 7/2015 | Marti et al. | |
| 2015/0321699 | A1* | 11/2015 | Rebhan | B60W 30/12 |
| | | | | 701/23 |
| 2016/0047895 | A1* | 2/2016 | Dussan | G01S 17/89 |
| | | | | 356/4.01 |
| 2016/0250963 | A1 | 9/2016 | Reuschel et al. | |
| 2018/0037153 | A1 | 2/2018 | Reuschel et al. | |
| 2018/0088572 | A1* | 3/2018 | Uchida | B60W 60/0053 |
| 2019/0031038 | A1* | 1/2019 | Pursifull | B60L 53/31 |
| 2019/0039503 | A1 | 2/2019 | Reuschel et al. | |
| 2019/0302761 | A1* | 10/2019 | Huang | G02B 27/017 |

FOREIGN PATENT DOCUMENTS

| | | |
|---|---|---|
| DE | 102013012779 A1 | 2/2015 |
| JP | H06-206493 A | 7/1994 |
| JP | H09-160643 A | 6/1997 |
| JP | H09-277887 A | 10/1997 |
| JP | 2006-190237 A | 7/2006 |
| JP | 2010-020371 A | 1/2010 |
| JP | 2014-164466 A | 9/2014 |
| JP | 2015-92237 A | 5/2015 |
| WO | 2015014964 A1 | 2/2015 |
| WO | 2015067353 A2 | 5/2015 |

OTHER PUBLICATIONS

International Search Report issued in PCT/JP2016/081787 dated Jan. 31, 2017 (5 pages).
Written Opinion issued in PCT/JP2016/081787 dated Jan. 31, 2017 (6 pages).
Office Action issued in corresponding Chinese Application No. 201680063150.4; dated Jul. 3, 2020 (23 pages).
Office Action issued in corresponding Chinese Application No. 201680063150.4; dated Mar. 16, 2021 (28 pages).

* cited by examiner

VEHICULAR ILLUMINATION DEVICE, VEHICLE SYSTEM AND VEHICLE

CROSS-REFERENCE TO RELATED APPLICATIONS

The present application is claims priority to Japanese Patent Application No. 2015-211216 filed on Oct. 27, 2015, Japanese Patent Application No. 2015-211227 filed on Oct. 27, 2015, and Japanese Patent Application No. 2015-211228 filed on Oct. 27, 2015, the contents of which are appropriately incorporated herein in their entirety.

BACKGROUND

Technical Field

The present disclosure relates to a vehicular illumination device. In particular, the present disclosure relates to a vehicular illumination device provided to a vehicle capable of traveling in an automatic driving mode. Also, the present disclosure relates to a vehicle system including the vehicular illumination device, and a vehicle including the vehicle system.

Related Art

Currently, research on an automatic driving technique of an automobile has been actively conducted in each country, and each country is considering the legislation so as to enable a vehicle (hereinafter, a "vehicle" refer to an automobile) to travel in an automatic driving mode on public roads. Here, in the automatic driving mode, a vehicle system automatically controls traveling of a vehicle. Specifically, in the automatic driving mode, the vehicle system performs at least one of steering control (control of the vehicle in the traveling direction), brake control and accelerator control (control of braking and acceleration/deceleration of the vehicle), based on various information obtained from a camera, a sensor, and a radar and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not automatically perform the steering control, the brake control and the accelerator control. Meanwhile, the driving mode of the vehicle is not a concept existing only in some vehicles but a concept existing in all vehicles including conventional vehicles having no automatic driving function, and is classified in accordance with a vehicle control method and the like, for example.

Thus, in the future, it is expected that vehicles traveling in the automatic driving mode (hereinafter, appropriately referred to as "automatic driving vehicle") and vehicles traveling in the manual driving mode (hereinafter, appropriately referred to as "manual driving vehicle") coexist on public roads.

Meanwhile, in the automatic driving vehicle, the traveling of the vehicle is automatically controlled by a computer such as an electronic control unit (ECU). For this reason, automatic traveling control (automatic brake control, automatic accelerator control, automatic steering control and the like) of the automatic driving vehicle applies a surprise event to a passenger in the vehicle, so that the passenger may get carsick.

Also, a driving mode of the vehicle under traveling may be automatically switched in a predetermined situation. For example, the automatic driving is implemented by a variety of on-board devices such as a camera, a radar, a sensor and the like. When at least one of the on-board devices becomes abnormal due to weather conditions such as bad weather, the driving mode of the vehicle may be automatically switched from the automatic driving mode to the manual driving mode. To the contrary, when all the on-board devices return to normal states, the driving mode of the vehicle may be automatically switched from the manual driving mode to the automatic driving mode. As another example, when the vehicle that is traveling in the automatic driving mode enters a travel-prohibited section in which the automatic driving vehicle is prohibited from traveling from a travel-allowed section in which the automatic driving vehicle is allowed to travel, the driving mode of the vehicle may be automatically switched from the automatic driving mode to the manual driving mode. To the contrary, when the vehicle that is traveling in the manual driving mode enters the allowed section from the prohibited section, the driving mode of the vehicle may be automatically switched from the manual driving mode to the automatic driving mode.

Also, according to one or more embodiments, information is presented that is indicative of the driving mode of the vehicle to the passenger (including the driver) in the vehicle that can travel in the automatic driving mode. For example, when the driving mode of the vehicle is presented to the driver, it is possible to prevent an accident, which may be caused due to a confusion about the driving mode, before it happens. Also, when the information, which indicates that the driving mode of the vehicle is the automatic driving mode, is presented not only to the driver but also to the other passengers, each passenger except the driver does not have to monitor a driving situation of the driver and thus can freely use the time for the passenger during the traveling. In the meantime, when the information, which indicates that the driving mode of the vehicle is the manual driving mode, is presented not only to the driver but also to the other passengers, each passenger except the driver monitors the driving situation of the driver all the time, so that it may be possible to prevent an accident, which may be caused due to driver's carelessness, before it happens.

Patent Document 1 discloses an automatic follow-up traveling system in which a following vehicle can automatically follow a preceding vehicle. In the automatic follow-up traveling system, each of the preceding vehicle and the following vehicle has a display device, character information for preventing the other vehicle from intruding between the preceding vehicle and the following vehicle is displayed on the display device of the preceding vehicle, and character information indicative of the automatic follow-up traveling mode is displayed on the display device of the following vehicle.

CITATION LIST

Patent Documents

Patent Document 1: JP-A-H09-277887

SUMMARY OF THE INVENTION

However, Patent Document 1 does not consider a means for preventing a surprise event from being applied to a passenger in a vehicle in a situation where traveling of the vehicle is automatically controlled.

Also, Patent Document 1 does not consider a means by which a driver in a vehicle can correctly perceive automatic switching of a driving mode of the vehicle before the driving mode of the vehicle is automatically switched.

Also, Patent Document 1 does not consider a means for presenting information indicative of a driving mode of a host vehicle toward a passenger.

One or more embodiments of the present disclosure provides a vehicular illumination device capable of preventing a surprise event from being applied to a passenger in a vehicle in a situation where traveling of the vehicle is automatically controlled.

One or more embodiments of the present disclosure provides a vehicular illumination device by which a driver and the like in a vehicle can correctly perceive automatic switching of a driving mode of the vehicle before the driving mode of the vehicle is automatically switched.

One or more embodiments of the present disclosure provides a vehicular illumination device capable of presenting information indicative of a driving mode of a host vehicle toward a passenger.

A vehicular illumination device according to one or more embodiments of the present disclosure is provided to a vehicle capable of driving in an automatic driving mode and includes an illumination unit configured to display advance-notice information for giving advance-notice of automatic traveling control of the vehicle so that a passenger in the vehicle can visually recognize the same, and an illumination control unit configured to control the illumination unit so that the passenger in the vehicle can visually recognize the advance-notice information before the automatic traveling control of the vehicle is executed.

According to the above configuration, the advance-notice information for giving advance-notice of the automatic traveling control of the vehicle so that the passenger can visually recognize the same is displayed, before the automatic traveling control of the vehicle is executed. In this way, it is possible to provide the vehicular illumination device capable of preventing a surprise event from being applied to the passenger in a situation where traveling of the vehicle is automatically controlled. Particularly, the passenger (according to one or more embodiments, all passengers) can perceive in advance that the automatic traveling control is to be executed by seeing the advance-notice information. In this way, it is possible to prevent the surprise event from being applied to the passenger or the passenger from getting carsick.

Also, the advance-notice information may include brake advance-notice information for giving advance notice of automatic brake control of the vehicle, accelerator advance-notice information for giving advance notice of automatic accelerator control of the vehicle and steering advance-notice information for giving advance notice of automatic steering control of the vehicle.

According to the above configuration, the passenger can perceive in advance that the automatic brake control, the automatic accelerator control and the automatic steering control are to be executed by seeing the brake advance-notice information, the accelerator advance-notice information and the steering advance-notice information. In this way, it is possible to prevent the surprise event from being applied to the passenger or the passenger from getting carsick.

Also, the illumination unit may be configured to display the advance-notice information on a road surface in front of the vehicle.

According to the above configuration, the passenger can perceive in advance that the automatic traveling control of the vehicle is to be executed by seeing the advance-notice information displayed on the road surface in front of the vehicle.

Also, the illumination unit may be configured to display the advance-notice information on a window of the vehicle.

According to the above configuration, the passenger can perceive in advance that the automatic traveling control of the vehicle is to be executed by seeing the advance-notice information displayed on the window of the vehicle.

Also, a vehicle system including the vehicular illumination device and a vehicle control unit configured to execute traveling control of the vehicle may be provided. In the vehicle system, when it is determined that at least the automatic traveling control of the vehicle should be executed, the vehicle control unit generates an instruction signal for instructing the advance-notice information to be displayed. The vehicular illumination device is configured to display the advance-notice information on the basis of the instruction signal so that the passenger in the vehicle can visually recognize the same before the vehicle control unit executes the automatic traveling control of the vehicle.

According to the above configuration, it is possible to provide the vehicle system capable of preventing the surprise event from being applied to the passenger in a situation where the traveling of the vehicle is automatically controlled.

A vehicular illumination device according to one or more embodiments of the present disclosure is provided to a vehicle capable of traveling in an automatic driving mode and includes an illumination unit configured to irradiate light toward at least a driver of the vehicle, and an illumination control unit configured to set an illumination state of the illumination unit to a predetermined illumination state on the basis of a switching advance-notice signal, which indicates that a driving mode of the vehicle is to be automatically switched, before the driving mode of the vehicle is automatically switched.

According to the above configuration, the illumination control unit is configured to set the illumination state of the illumination unit to the predetermined illumination state before the driving mode of the vehicle is switched. In this way, it is possible to provide the vehicular illumination device by which the driver and the like in the vehicle can correctly perceive the automatic switching of the driving mode of the vehicle before the driving mode of the vehicle is automatically switched. Accordingly, it is possible to prevent a situation where the surprise event, which is associated with the automatic switching of the driving mode of the vehicle, is applied to the driver and the like in the vehicle.

Also, the illumination control unit may be configured to set the illumination state of the illumination unit to the predetermined illumination state on the basis of the switching advance-notice signal before the driving mode of the vehicle is automatically switched between an automatic driving mode and a manual driving mode.

According to the above configuration, it is possible to provide the vehicular illumination device by which the driver and the like in the vehicle can correctly perceive the automatic switching of the driving mode of the vehicle before the driving mode of the vehicle is automatically switched between the automatic driving mode and the manual driving mode.

Also, the illumination control unit may be configured to set the illumination state of the illumination unit to the predetermined illumination state on the basis of the switching advance-notice signal before the driving mode of the vehicle is automatically switched between a full-automatic driving mode or an advanced driving support mode and a driving support mode or a manual driving mode.

According to the above configuration, it is possible to provide the vehicular illumination device by which the driver and the like in the vehicle can correctly perceive the automatic switching of the driving mode of the vehicle before the driving mode of the vehicle is automatically switched between the full-automatic driving mode or the advanced driving support mode and the driving support mode or the manual driving mode.

Also, the illumination control unit may be configured to turn on or turn off the illumination unit on the basis of the switching advance-notice signal.

According to the above configuration, the driver and the like in the vehicle can correctly perceive in advance the automatic switching of the driving mode of the vehicle by seeing the lighting or lights-out state of the illumination unit.

Also, a vehicle system including the vehicular illumination device and a vehicle control unit configured to generate the switching advance-notice signal and to automatically switch the driving mode of the vehicle may be provided.

According to the above configuration, it is possible to provide the vehicle system by which the driver and the like in the vehicle can correctly perceive the automatic switching of the driving mode of the vehicle before the driving mode of the vehicle is automatically switched.

A vehicular illumination device according to one or more embodiments of the present disclosure is configured to display information indicative of a driving mode of a vehicle toward a passenger in the vehicle capable of traveling in an automatic driving mode, and includes:

an illumination unit mounted to a ceiling of the vehicle so as to irradiate light toward the passenger in the vehicle, and an illumination control unit configured to set an illumination state of the illumination unit to a predetermined illumination state, in accordance with the driving mode of the vehicle.

According to the above configuration, it is possible to provide the vehicular illumination device capable of presenting the information indicative of the driving mode of the host vehicle toward the passenger. Accordingly, the passenger can perceive the driving mode of the host vehicle by seeing the illumination state of the illumination unit.

Also, the illumination control unit may turn on or turn off the illumination unit when the driving mode of the vehicle is a predetermined driving mode.

According to the above configuration, the passenger can perceive that the driving mode of the host vehicle is the predetermined driving mode.

Also, the illumination control unit may turn on or turn off the illumination unit when the driving mode of the vehicle is a full-automatic driving mode.

According to the above configuration, the passenger can perceive that the driving mode of the host vehicle is the full-automatic driving mode.

Also, the illumination control unit may turn on or turn off the illumination unit when the driving mode of the vehicle is a full-automatic driving mode or an advanced driving support mode.

According to the above configuration, the passenger can perceive that the driving mode of the host vehicle is the full-automatic driving mode or the advanced driving support mode.

Also, the illumination control unit may turn on or turn off the illumination unit when the driving mode of the vehicle is a full-automatic driving mode, an advanced driving support mode or a driving support mode.

According to the above configuration, the passenger can perceive that the driving mode of the host vehicle is the full-automatic driving mode, the advanced driving support mode or the driving support mode. In other words, the passenger can perceive that the driving mode of the host vehicle is an automatic driving mode.

Also, the illumination control unit may set the illumination state of the illumination unit to a first illumination state when the driving mode of the vehicle is a full-automatic driving mode, the illumination control unit may set the illumination state of the illumination unit to a second illumination state when the driving mode of the vehicle is an advanced driving support mode, the illumination control unit may set the illumination state of the illumination unit to a third illumination state when the driving mode of the vehicle is a driving support mode, and the illumination control unit may set the illumination state of the illumination unit to a fourth illumination state when the driving mode of the vehicle is a manual driving mode.

According to the above configuration, the passenger can perceive whether the driving mode of the host vehicle is the full-automatic driving mode, the advanced driving support mode, the driving support mode or the manual driving mode.

Also, the illumination control unit may be configured to change an illumination color, a luminescence intensity, a light emitting area or a blinking cycle of the illumination unit in accordance with the driving mode of the vehicle.

According to the above configuration, the passenger can perceive the information indicative of the driving mode of the host vehicle by the illumination color, the luminescence intensity, the light emitting area or the blinking cycle of the illumination unit.

Also, a vehicle system including the vehicular illumination device and a vehicle control unit configured to transmit a mode signal indicative of the driving mode of the vehicle to the vehicular illumination device and configured to control traveling of the vehicle may be provided.

According to the above configuration, it is possible to provide the vehicle system capable of presenting the information indicative of the driving mode of the host vehicle toward the passenger.

Also, a vehicle including the vehicle system may be provided.

According to according to one or more embodiments of the present disclosure, it is possible to provide the vehicular illumination device capable of preventing the surprise event from being applied to the passenger in a situation where the traveling of the vehicle is automatically controlled.

According to according to one or more embodiments of the present disclosure, it is possible to provide the vehicular illumination device by which the driver and the like in the vehicle can correctly perceive the automatic switching of the driving mode of the vehicle before the driving mode of the vehicle is automatically switched.

According to according to one or more embodiments of the present disclosure, it is possible to provide the vehicular illumination device capable of presenting the information indicative of the driving mode of the host vehicle toward the passenger.

DETAILED DESCRIPTION

First Illustrative Embodiment

Figure 1:
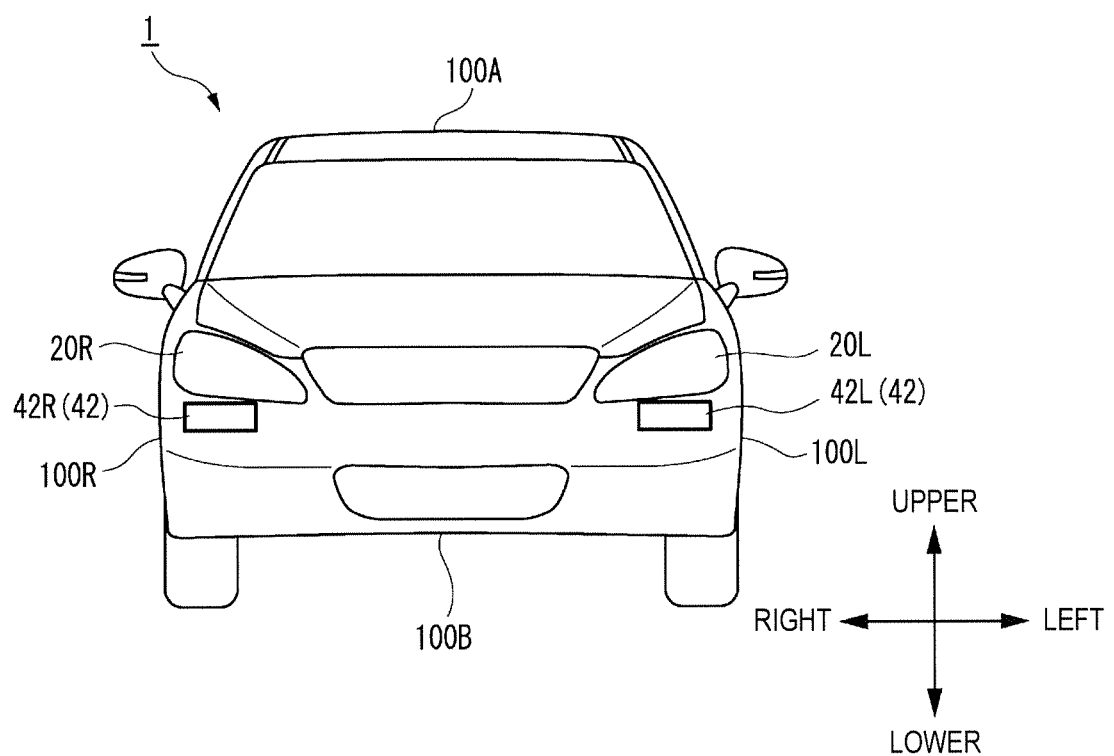
FIG. 1 is a front view of a vehicle to which a vehicular illumination device in accordance with a first illustrative embodiment of the present invention (hereinafter, simply referred to as a "first illustrative embodiment") is mounted.

Hereinafter, a first illustrative embodiment will be described with reference to the drawings. In the meantime, for the sake of convenience of description, the description of members having the same reference numerals as those already described in the description of the first illustrative embodiment will be omitted. Also, for the sake of convenience of description, dimensions of the respective members shown in the drawings may be different from actual dimensions of the respective members.

Also, for the sake of convenience of description, "a right and left direction," "a front and rear direction," and "an upper and lower direction" are appropriately mentioned in the description of the first illustrative embodiment. These directions refer to the relative directions set for a vehicle 1 shown in FIG. 1. Here, "the upper and lower direction" refers to a direction including "an upper direction" and "a lower direction." "The front and rear direction" refers to a direction including "a front direction" and "a rear direction." "The right and left direction" refers to a direction including "a left direction" and "a right direction.

A vehicular illumination device 4 (hereinafter, simply referred to as "illumination device 4") in accordance with the first illustrative embodiment is described. FIG. 1 is a front view of the vehicle 1 to which the illumination device 4 (refer to FIG. 2) in accordance with the first illustrative embodiment is mounted. The vehicle 1 is an automobile capable of traveling in an automatic driving mode and includes the illumination device 4. The illumination device 4 includes an illumination unit 42 and an illumination control unit 43 (refer to FIG. 2). The illumination unit 42 is configured to display advance-notice information for giving advance notice (hereinafter, simply referred to as 'advance-notice information') of automatic traveling control (automatic brake control, automatic accelerator control and automatic steering control) of the vehicle 1 so that a passenger in the vehicle 1 can visually recognize the same, and includes a left illumination unit 42L and a right illumination unit 42R. As described later, the advance-notice information includes brake advance-notice information for giving advance notice of automatic brake control of the vehicle 1, accelerator advance-notice information for giving advance notice of automatic accelerator control of the vehicle 1, and steering advance-notice information for giving advance notice of automatic steering control of the vehicle 1.

The left illumination unit 42L is arranged in the vicinity of a left headlamp 20L, and the right illumination unit 42R is arranged in the vicinity of a right headlamp 20R. Each of the left illumination unit 42L and the right illumination unit 42R is, for example, a laser scanning device that includes a laser light source and an optical deflection device configured to deflect laser light emitted from the laser light source. The optical deflection device is, for example, a movable mirror such as an MEMS (Micro Electro Mechanical Systems) mirror or a galvanometer mirror. As described later, the illumination unit 42 is configured to scan the laser light to draw a brake mark M1 and an accelerator mark M2 shown in FIG. 5 on a road surface in front of the vehicle 1, as the advance-notice information.

Meanwhile, in the first illustrative embodiment, the left illumination unit 42L and the right illumination unit 42R are arranged in the vicinity of the left headlamp 20L and the right headlamp 20R, respectively. However, the number, arrangement and the like of the illumination units 42 are not particularly limited inasmuch as the illumination unit 42 (the left illumination unit 42L and the right illumination unit 42R) is configured to display the advance-notice information so that the passenger can visually recognize the same. For example, the left illumination unit 42L may be arranged in the left headlamp 20L, and the right illumination unit 42R may be arranged in the right headlamp 20R. Also, the left illumination unit 42L may be arranged on a left surface 100L, and the right illumination unit 42R may be arranged on a right surface 100R. Also, the single illumination unit 42 may be arranged on a vehicle body roof 100A of the vehicle 1 or on a back surface 100B facing a road surface.

Figure 2:
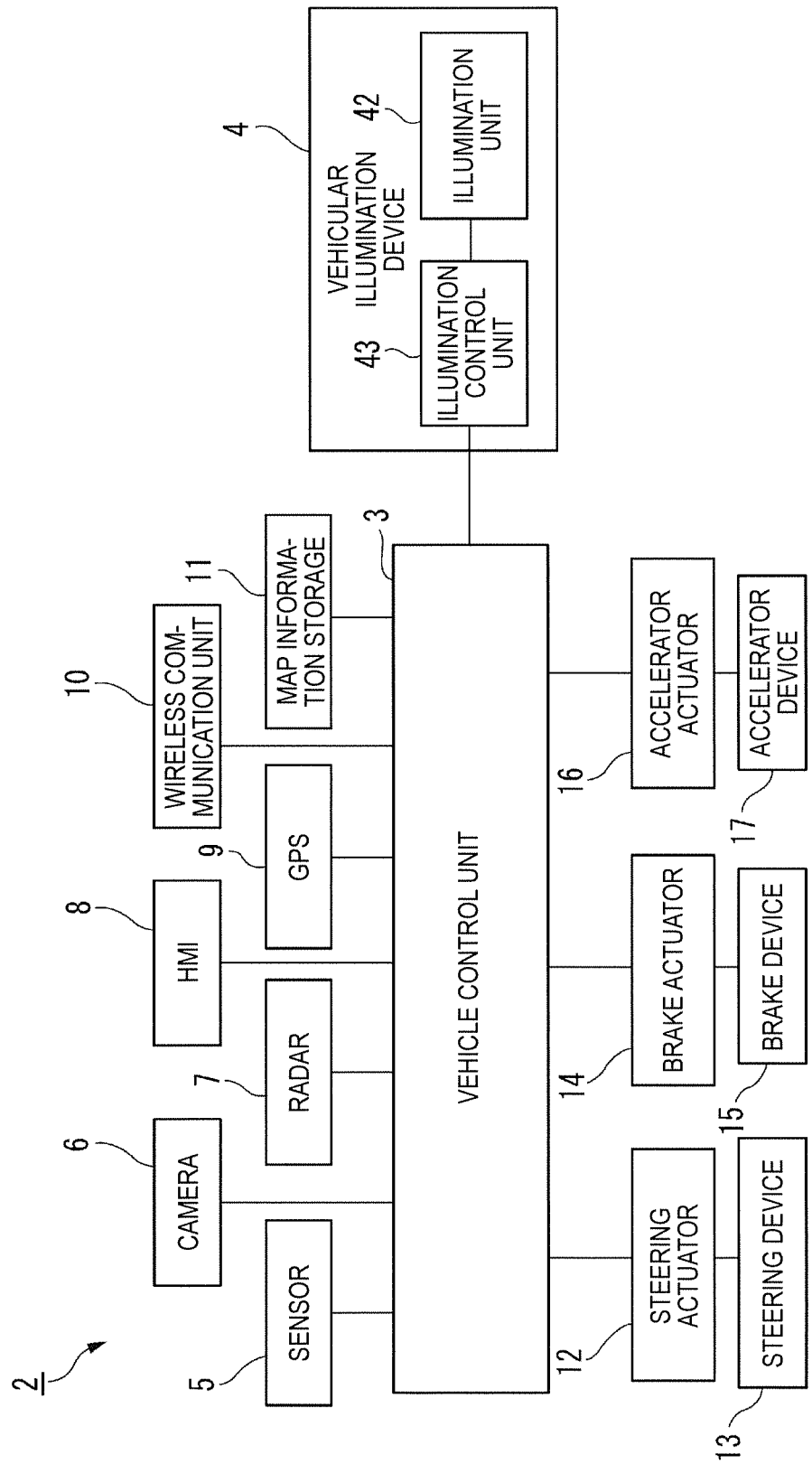
FIG. 2 is a block diagram of a vehicle system including the vehicular illumination device in accordance with the first illustrative embodiment.

Subsequently, a vehicle system 2 of the vehicle 1 is described with reference to FIG. 2. FIG. 2 is a block diagram of the vehicle system 2. As shown in FIG. 2, the vehicle system 2 includes a vehicle control unit 3, the illumination device 4, a sensor 5, a camera 6, a radar 7, an HMI (Human Machine Interface) 8, a GPS (Global Positioning System) 9, a wireless communication unit 10, and a map information storage 11. The vehicle system 2 further includes a steering actuator 12, a steering device 13, a brake actuator 14, a brake device 15, an accelerator actuator 16, and an accelerator device 17.

The vehicle control unit 3 is configured to control traveling of the vehicle 1. The vehicle control unit 3 is configured by, for example, an electronic control unit (ECU). The electronic control unit includes a microcontroller having a processor and a memory, and other electronic circuits (for example, transistors, etc.). The processor is, for example, a CPU (Central Processing Unit), an MPU (Micro Processing Unit) and/or a GPU (Graphics Processing Unit). The memory includes a ROM (Read Only Memory) in which various vehicle control programs (for example, an artificial intelligence (AI) program for automatic driving, and the like) are stored, and a RAM (Random Access Memory) in which various vehicle control data is temporarily stored. The processor is configured to develop, on the RAM, a program designated from the various vehicle control programs stored in the ROM and to execute a variety of processing in cooperation with the RAM.

The illumination device 4 is configured to display the advance-notice information so that the passenger can visually recognize the same, and includes the illumination unit 42 and the illumination control unit 43. The illumination control unit 43 is configured by an electronic control unit (ECU). The electronic control unit is electrically connected to a power supply (not shown), and includes a microcontroller having a processor such as a CPU and a GPU and a memory such as a ROM and a RAM, and other electronic circuits (for example, a drive circuit such as an LED driver). In the first illustrative embodiment, the vehicle control unit 3 and the illumination control unit 43 are provided as separate components but may be integrally configured. That is, the illumination control unit 43 and the vehicle control unit 3 may be configured by a single electronic control unit. The illumination control unit 43 is configured to control the illumination unit 42 so that the passenger in the vehicle 1 can visually recognize the advance-notice information before the automatic traveling control of the vehicle 1 is executed. Particularly, in the first illustrative embodiment, the illumination control unit 43 is configured to control the illumination unit 42 so that the advance-notice information is to be displayed on the road surface in front of the vehicle 1.

For example, when it is determined that at least the automatic traveling control of the vehicle 1 should be executed, the vehicle control unit 3 generates an instruction signal for instructing the advance-notice information to be displayed and transmits the instruction signal to the illumination control unit 43. The illumination control unit 43 is configured to drive and control the illumination unit 42 on the basis of the received instruction signal, thereby displaying the advance-notice information on the road surface in front of the vehicle 1. In the meantime, the illumination control unit 43 and the vehicle control unit 3 may be configured by the same electronic control unit.

The sensor 5 includes an acceleration sensor, a speed sensor, a gyro sensor, and the like. The sensor 5 is configured to detect a traveling condition of the vehicle 1 and to output traveling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether a passenger is inside a vehicle, and the like. Also, the sensor 5 may include an illuminance sensor configured to detect illuminance of a surrounding environment of the vehicle 1.

The camera 6 is, for example, a camera including an imaging device such as a CCD (Charge-Coupled Device) and CMOS (complementary MOS). The radar 7 is a millimeter wave radar, a microwave radar, a laser radar, or the like. The camera 6 and the radar 7 are configured to detect surrounding environments (other vehicles, pedestrians, road shapes, traffic signs, obstacles, and the like) of the vehicle 1 and to output surrounding environment information to the vehicle control unit 3.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The output unit is a display configured to display diverse traveling information.

The GPS 9 is configured to acquire current position information of the vehicle 1 and to output the acquired current position information to the vehicle control unit 3. The wireless communication unit 10 is configured to receive traveling information of other vehicles around the vehicle 1 from the other vehicles and to transmit the traveling information of the vehicle 1 to the other vehicles (inter-vehicle communication). Also, the wireless communication unit 10 is configured to receive infrastructure information from infrastructure equipment such as traffic lights and sign lamps and to transmit the traveling information of the vehicle 1 to the infrastructure equipment (road-to-vehicle communication). Also, the wireless communication unit 10 is configured to receive predetermined information from a mobile device that is carried by a pedestrian, and to transmit the traveling information of the vehicle 1 to the mobile device (pedestrian-to-vehicle communication). The map information storage 11 is an external storage device such as a hard disk drive in which map information is stored, and is configured to output the map information to the vehicle control unit 3.

When the vehicle 1 travels in an automatic driving mode, the vehicle control unit 3 automatically generates at least one of a steering control signal, an accelerator control signal and a brake control signal, based on the traveling condition information, the surrounding environment information, the current position information, the map information, and the like. The steering actuator 12 is configured to receive the steering control signal from the vehicle control unit 3 and to drive and control the steering device 13 on the basis of the received steering control signal. The brake actuator 14 is configured to receive the brake control signal from the vehicle control unit 3 and to drive and control the brake device 15 on the basis of the received brake control signal. The accelerator actuator 16 is configured to receive the accelerator control signal from the vehicle control unit 3 and to drive and control the accelerator device 17 on the basis of the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a manual operation of a driver on the accelerator pedal, the brake pedal and the steering wheel. In this way, in the manual driving mode, the steering control signal, the accelerator control signal and the brake control signal are generated by the manual operation of the driver, so that the traveling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the traveling controls of the steering control, the brake control and the accelerator control, and the driver is not in a state where it is possible to drive the vehicle 1. In the advanced driving support mode, the vehicle system 2 is configured to automatically perform all of the traveling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the traveling controls of the steering control, the brake control and the accelerator control, and the driver drives the vehicle 1 under the driving support of the vehicle system 2. On the other hand, in the manual driving mode, the vehicle system 2 is configured not to automatically perform the traveling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in accordance with a driver's operation on the driving mode changeover switch. Also, the driving mode of the vehicle 1 may be automatically switched on the basis of information relating to a travel-allowed section where the automatic driving vehicle is allowed to travel or a travel-prohibited section where the automatic driving vehicle is prohibited from traveling or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

Figure 3:
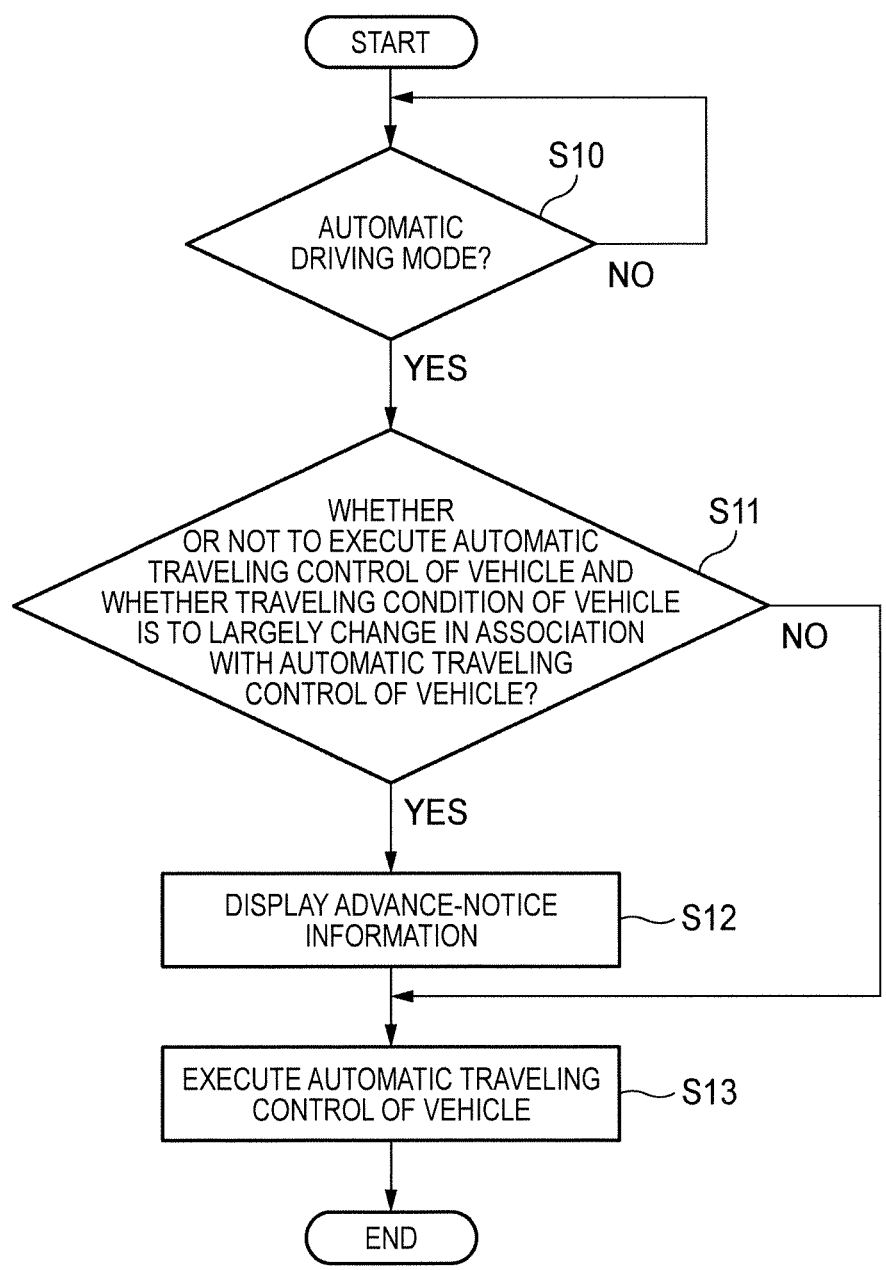
FIG. 3 is a flowchart depicting processing of displaying advance-notice information.

Subsequently, processing of displaying the advance-notice information is described with reference to FIG. 3.

First, the vehicle control unit 3 determines whether the driving mode of the vehicle 1 is the automatic driving mode (step S10). When it is determined that the driving mode of the vehicle 1 is the automatic driving mode (YES in step S10), the vehicle control unit 3 determines whether or not to execute the automatic traveling control of the vehicle 1 and whether the traveling condition of the vehicle 1 is to largely change in association with the automatic traveling control of the vehicle 1 (step S11). On the other hand, when it is determined that the driving mode of the vehicle 1 is not the automatic driving mode (that is, when it is determined that the driving mode of the vehicle 1 is the manual driving mode) (NO in step S10), the vehicle control unit 3 stands by until the driving mode of the vehicle 1 becomes the automatic driving mode.

Here, the vehicle control unit 3 may be configured to determine whether or not to execute the automatic traveling control of the vehicle 1, based on the surrounding environment information obtained from the camera 6 or the radar 7. Also, the vehicle control unit 3 may be configured to determine whether a change in the traveling condition of the vehicle 1 is large by comparing a change in the traveling condition of the vehicle 1 and predetermined threshold information stored in the memory. For example, when it is determined that predicted acceleration α is greater than a threshold acceleration αth stored in the memory, the vehicle control unit 3 determines that the traveling condition of the vehicle 1 is to largely change. To the contrary, when it is determined that the predicted acceleration α is equal to or less than the threshold acceleration αth stored in the memory, the vehicle control unit 3 determines that the traveling condition of the vehicle 1 does not largely change.

When the change in the traveling condition of the vehicle 1 is small, a possibility that the passenger will be applied with a surprise event by the automatic traveling control is low. Therefore, it is thought that it is less necessary for the illumination device 4 to display the advance-notice information. For this reason, in step S11, the vehicle control unit 3 determines whether the traveling condition of the vehicle 1 is to largely change. Meanwhile, in step S11, the vehicle control unit 3 may just determine whether or not to execute the automatic traveling control of the vehicle 1. In this case, the illumination device 4 may display the advance-notice information, irrespective of the magnitude of the change in the traveling condition of the vehicle 1.

When it is determined that it is necessary to execute the automatic traveling control of the vehicle 1 and the traveling condition of the vehicle 1 is to largely change in association with the automatic traveling control of the vehicle 1 (YES in step S11), the vehicle control unit 3 generates an instruction signal for instructing the advance-notice information to be displayed, and transmits the instruction signal to the illumination control unit 43. Then, the illumination control unit 43 drives and controls the illumination unit 42 on the basis of the received instruction signal. As a result, the advance-notice information (a general term of the brake advance-notice information, the accelerator advance-notice information and the steering advance-notice information) formed by the laser scanning is displayed on the road surface in front of the vehicle 1 so that the passenger can visually recognize the same (step S12).

Then, the vehicle control unit 3 generates a traveling control signal (a general term of the brake control signal, the accelerator control signal and the steering control signal), and transmits the traveling control signal to an actuator (a general term of the steering actuator 12, the brake actuator 14 and the accelerator actuator 16). The actuator drives and controls a device (a general term of the steering device 13, the brake device 15 and the accelerator device 17) configured to change the traveling condition of the vehicle 1, based on the received traveling control signal, thereby executing the automatic traveling control of the vehicle 1 (step 13). On the other hand, when a determination result in step S11 is NO, the advance-notice information is not displayed and only the automatic traveling control of the vehicle 1 is executed. In this way, the series of processing is over.

Meanwhile, in step S10, the vehicle control unit 3 determines whether the driving mode of the vehicle 1 is the automatic driving mode. However, instead of this configuration, the vehicle control unit 3 may determine whether the driving mode of the vehicle 1 is the automatic driving mode except the driving support mode. That is, when the vehicle 1 is traveling in the full-automatic driving mode or the advanced driving support mode, the passenger (particularly, the driver) may be applied with the surprise event or is likely to get carsick because the passenger cannot perceive in advance the automatic traveling control of the vehicle 1. For this reason, when the driving mode is the full-automatic driving mode or the advanced driving support mode, the advance-notice information is particularly beneficial to the passenger.

Subsequently, processing of displaying the brake advance-notice information of the advance-notice information is described with reference to FIG. 4. Here, the brake advance-notice information is information for giving advance notice of the automatic brake control of the vehicle 1. First, in step S20, the vehicle control unit 3 determines whether the driving mode of the vehicle 1 is the automatic driving mode. Since the processing of step S20 is the same as the processing of step S10, the description thereof is here omitted. Then, in step S21, the vehicle control unit 3 determines whether or not to execute the automatic brake control of the vehicle 1 and whether the traveling condition of the vehicle 1 is to largely change in association with the automatic brake control of the vehicle 1. For example, the vehicle control unit 3 may determine whether or not to execute the automatic brake control of the vehicle 1, based on the surrounding environment information. Also, when it is determined that a predicted deceleration $\beta$ (minus acceleration) is greater than a threshold deceleration $\beta$th stored in the memory, the vehicle control unit 3 determines that the traveling condition of the vehicle 1 is to largely change. To the contrary, when it is determined that the predicted deceleration $\beta$ is equal to or less than the threshold deceleration $\beta$th stored in the memory, the vehicle control unit 3 determines that the traveling condition of the vehicle 1 does not largely change.

When it is determined that it is necessary to execute the automatic brake control of the vehicle 1 and the traveling condition of the vehicle 1 is to largely change in association with the automatic brake control of the vehicle 1 (YES in step S21), the vehicle control unit 3 generates an instruction signal for instructing the brake advance-notice information to be displayed, and transmits the instruction signal to the illumination control unit 43. Then, the illumination control unit 43 drives and controls the illumination unit 42, based on the received instruction signal. As a result, the brake advance-notice information formed by the laser scanning is displayed on the road surface in front of the vehicle 1 so that the passenger can visually recognize the same (step S22).

Then, the vehicle control unit 3 generates a brake control signal and transmits the brake control signal to the brake actuator 14. The brake actuator 14 controls the brake device 15 on the basis of the received brake control signal, thereby executing the automatic brake control of the vehicle 1 (step S23). On the other hand, when a determination result in step S21 is NO, the brake advance-notice information is not displayed and only the automatic brake control of the vehicle 1 is executed. In this way, the series of processing is over.

Figure 4:
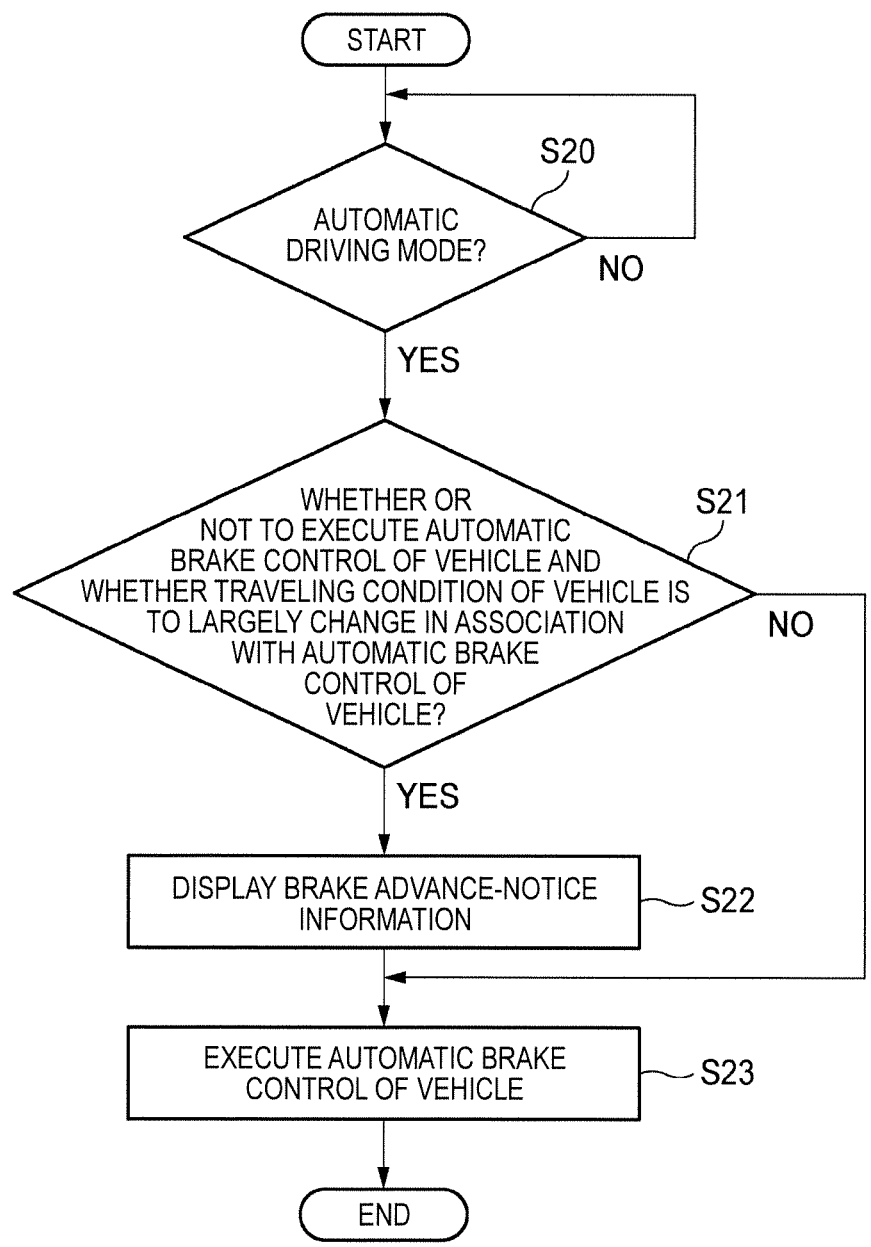
FIG. 4 is a flowchart depicting processing of displaying brake advance-notice information.

Also, processing of displaying the accelerator advance-notice information for giving advance notice of the automatic accelerator control of the vehicle 1 and processing of displaying the steering advance-notice information for giving advance notice of the automatic steering control of the vehicle 1 are executed in similar methods to the processing of displaying the brake advance-notice information shown in FIG. 4.

That is, when it is determined that it is necessary to execute the automatic accelerator control of the vehicle 1 and the traveling condition of the vehicle 1 is to largely change in association with the automatic accelerator control of the vehicle 1, the vehicle control unit 3 generates an instruction signal for instructing the accelerator advance-notice information to be displayed and transmits the instruction signal to the illumination control unit 43. Then, the illumination control unit 43 drives and controls the illumination unit 42, based on the received instruction signal. As a result, the accelerator advance-notice information formed by the laser scanning is displayed on the road surface in front of the vehicle 1 so that the passenger can visually recognize the same. Then, the vehicle control unit 3 generates an accelerator control signal and transmits the accelerator control signal to the accelerator actuator 16. The accelerator actuator 16 controls the accelerator device 17 on the basis of the received accelerator control signal, thereby executing the automatic accelerator control of the vehicle 1.

Also, when it is determined that it is necessary to execute the automatic steering control of the vehicle 1 and the traveling condition of the vehicle 1 is to largely change in association with the automatic steering control of the vehicle 1, the vehicle control unit 3 generates an instruction signal for instructing the steering advance-notice information to be displayed and transmits the instruction signal to the illumination control unit 43. Then, the illumination control unit 43 drives and controls the illumination unit 42, based on the received instruction signal. As a result, the steering advance-notice information formed by the laser scanning is displayed on the road surface in front of the vehicle 1 so that the passenger can visually recognize the same. Then, the vehicle control unit 3 generates a steering control signal and transmits the steering control signal to the accelerator actuator 16. The steering actuator 12 controls the steering device 13 on the basis of the received steering control signal, thereby executing the automatic steering control of the vehicle 1.

Figure 5:
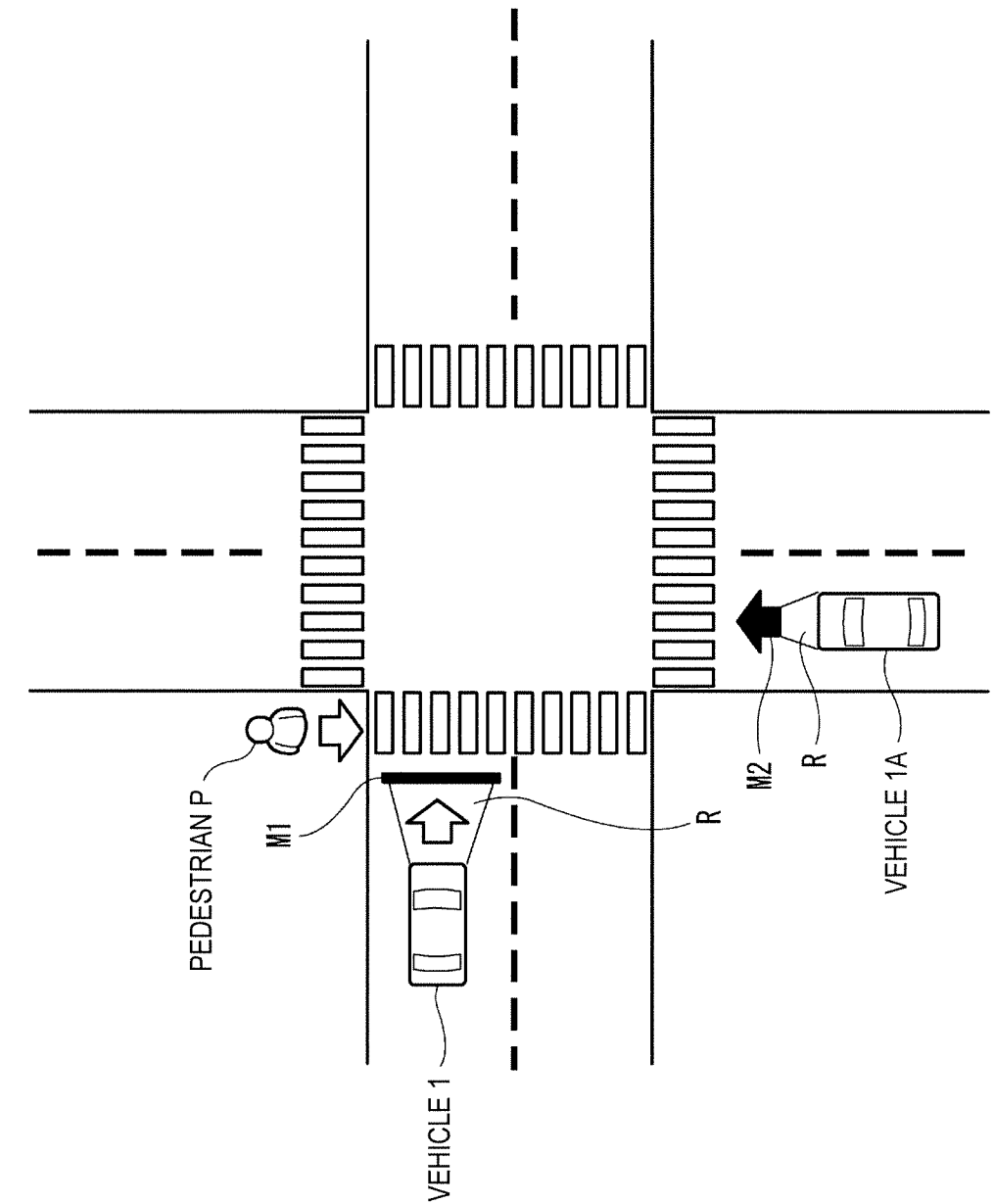
FIG. 5 is a view depicting an example of brake advance-notice information and accelerator advance-notice information that are to be displayed on a road surface in front of the vehicle.
Figure 6:
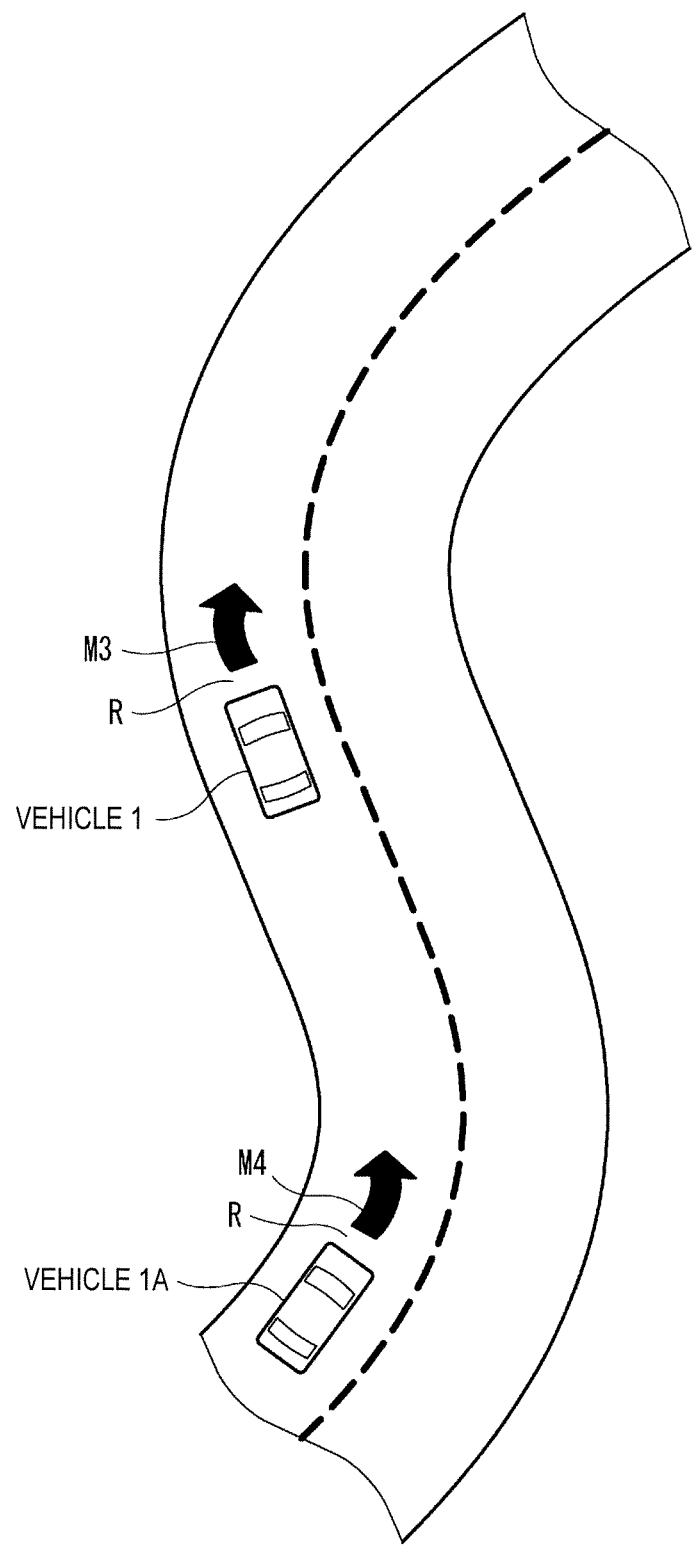
FIG. 6 is a view depicting an example of steering advance-notice information that is to be displayed on the road surface in front of the vehicle.

Subsequently, an example of the brake advance-notice information, the accelerator advance-notice information and the steering advance-notice information, which are to be displayed on the road surface R in front of the vehicle 1, is described with reference to FIGS. 5 and 6. FIG. 5 depicts a brake mark M1, which is an example of the brake advance-notice information to be displayed on the road surface R in front of the vehicle 1, and an accelerator mark M2, which is an example of the accelerator advance-notice information to be displayed on the road surface R in front of a vehicle 1A. FIG. 6 depicts a right curve mark M3, which is an example of the steering advance-notice information to be displayed on the road surface R in front of the vehicle 1, and a left curve mark M4, which is an example of the steering advance-notice information to be displayed on the road surface R in front of the vehicle 1A. Here, it is assumed that the vehicle 1A includes a vehicle system having the same configuration as the vehicle system 2 of the vehicle 1.

As described above, the illumination unit 42 (the left illumination unit 42L and the right illumination unit 42R) is configured by a laser light source configured to emit laser light and an optical deflection device configured to deflect the laser light. Therefore, when the illumination control unit 43 drives and controls the illumination unit 42 based on the instruction signal, the optical deflection device deflects the laser light and scans the laser light on the road surface R in front of the vehicle 1. In this way, the brake mark M1, the accelerator mark M2, the right curve mark M3 and the left curve mark M4 are respectively displayed on the road surface R by the scanning of the laser light.

As shown in FIG. 5, before the automatic brake control of the vehicle 1 is executed, the brake mark M1 is displayed on the road surface R in front of the vehicle 1. In addition to this, before the vehicle 1 stops, a stop mark (not shown) such as a crosswalk may be displayed on the road surface R after the display of the brake mark M1, as stop advance-notice information for giving advance notice of stop of the vehicle 1. Thereby, a pedestrian P trying to cross a crosswalk can cross in relief the crosswalk by seeing the stop mark. Also, a shape and the like of the accelerator mark M2 to be displayed on the road surface R in front of the vehicle 1A may be changed in accordance with a magnitude of the acceleration. Also, according to one or more embodiments, a color of the laser light is green.

As shown in FIG. 6, the right curve mark M3 may be displayed on the road surface R in front of the vehicle 1 before the vehicle 1 reaches a right curve. Likewise, the left curve mark M4 may be displayed on the road surface R in front of the vehicle 1A before the vehicle 1A reaches a left curve. Also, when the vehicle 1 turns right at an intersection point, a right turn mark (not shown), which is an example of the steering advance-notice information, may be displayed on the road surface before the vehicle 1 turns right. Likewise, when the vehicle 1 turns left at an intersection point, a left turn mark (not shown), which is an example of the steering advance-notice information, may be displayed on the road surface before the vehicle 1 turns left.

According to the first illustrative embodiment, the advance-notice information (the brake advance-notice information, the accelerator advance-notice information and the steering advance-notice information) for giving advance notice of the automatic traveling control of the vehicle 1 (the automatic brake control, the automatic accelerator control and the automatic steering control) is displayed so that the passenger can visually recognize the same, before the automatic traveling control of the vehicle 1 is executed. In this way, it is possible to provide the illumination device 4 capable of preventing the surprise event from being applied to the passenger in a situation where the traveling of the vehicle 1 is automatically controlled. Particularly, the passenger (according to one or more embodiments, all the passengers) can perceive in advance that the automatic traveling control is to be executed by seeing the advance-notice information. Accordingly, it is possible to prevent the surprise event from being applied to the passenger or the passenger from getting carsick. Particularly, the passenger can perceive in advance that the automatic traveling control of the vehicle 1 is to be executed by seeing the advance-notice information displayed on the road surface R in front of the vehicle 1.

Meanwhile, in the first illustrative embodiment, the brake mark M1, the accelerator mark M2, the right curve mark M3 and the left curve mark M4 have been exemplified as the advance-notice information. However, the other figures or character information may be displayed on the road surface R.

<First Modification of Illumination Unit>

Figure 7:
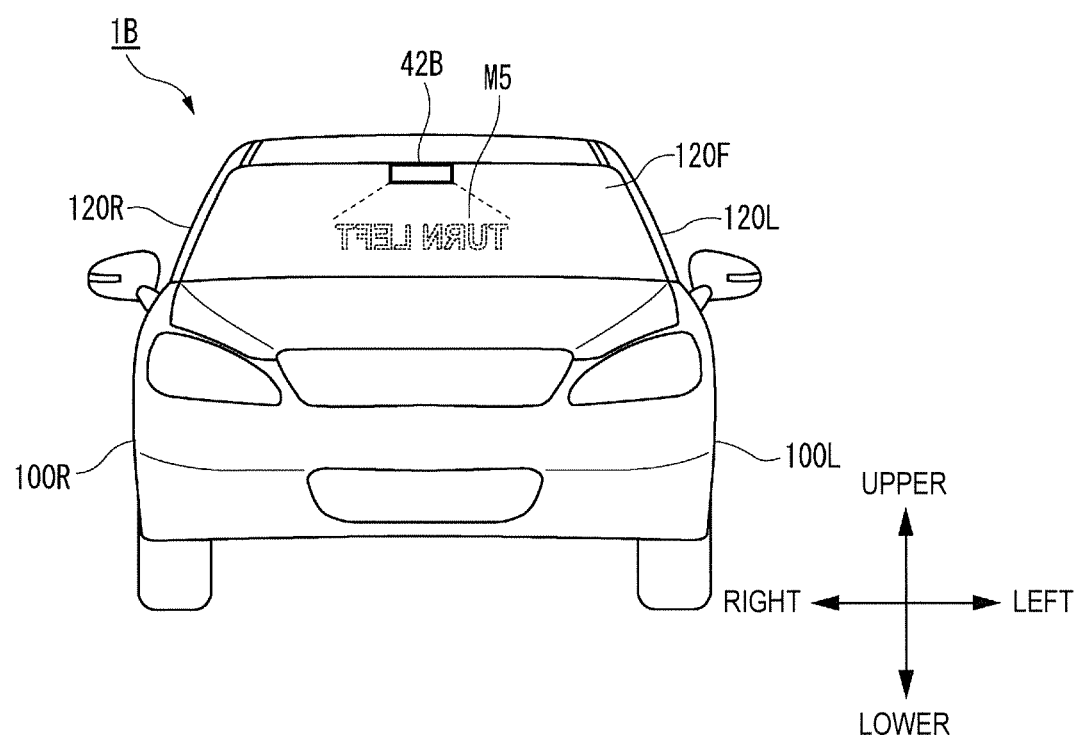
FIG. 7 is a front view of a vehicle to which an illumination unit in accordance with a first modified embodiment of the first illustrative embodiment is mounted.

Subsequently, a first modified embodiment of the illumination unit is described with reference to FIG. 7. FIG. 7 is a front view of a vehicle 1B to which an illumination unit 42B relating to the first modified embodiment is mounted. In the first modified embodiment, the illumination unit 42B is configured to display character information M5 ("TURN LEFT") on a front window 120F of the vehicle 1B, as an example of the steering advance-notice information. The illumination unit 42B is a projection device such as a projector configured to project the character information M5 on the front window 120F, and is arranged at a predetermined place on the front window 120F. The illumination control unit 43 is configured to drive and control the illumination unit 42B on the basis of an instruction signal received from the vehicle control unit 3. As a result, the steering advance-notice information projected from the illumination unit 42B is displayed on the front window 120F of the vehicle 1B. Here, since the character information M5 is displayed so that the passenger in the vehicle 1B can visually recognize the same, the character information M5 is displayed on an inner surface (a surface facing a vehicle interior) of the front window 120F.

Also, in the first modified embodiment, the character information M5 has been exemplified as the steering advance-notice information. Likewise, character information M6 (not shown), which is an example of the accelerator advance-notice information, or character information M7 (not shown), which is an example of the brake advance-notice information, may be displayed on the inner surface of the front window 120F.

Like this, according to the first modified embodiment, since the illumination unit 42B is configured to display the advance-notice information on the front window 120F of the vehicle 1B, the passenger in the vehicle 1B can perceive in advance that the automatic traveling control of the vehicle 1B is to be executed by seeing the advance-notice information displayed on the front window 120F of the vehicle 1B.

Meanwhile, in the first modified embodiment, the illumination unit 42B is arranged on the front window 120F. However, the illumination unit 42B may also be configured integrally with the front window 120F. In this case, the front window 120F functions as a display device configured to display the character information M5. Also, the illumination unit 42B may be arranged on a side window 120L or a side window 120R. Also, the illumination unit 42B may be arranged on the front window 120F and separate illumination units (not shown) may be arranged on the side windows 120L, 120R, respectively. In this way, the advance-notice information such as the character information M5 is displayed on the front window 120F and the side windows 120L, 120R, so that all the passengers in the vehicle 1B can visually recognize the advance-notice information. As a result, it is possible to prevent the surprise event from being applied to all the passengers in the vehicle 1B and all the passengers from getting carsick.

Also, the character information M5 shown in FIG. 7 is just an example, and other character information and figure information (for example, a left turn arrow and the like) may be displayed on the front window 120F, as the steering advance-notice information. Likewise, instead of the character information M6, other character information and figure information may be displayed on the front window 120F, as the accelerator advance-notice information. Also, instead of the character information M7, other character information and figure information may be displayed on the front window 120F, as the brake advance-notice information.

Also, in the above embodiments, the illumination units 42 and 42B configured to display the advance-notice information have been respectively described. However, the vehicle may include both the illumination unit 42 and the illumination unit 42B.

Second Illustrative Embodiment

Figure 8:
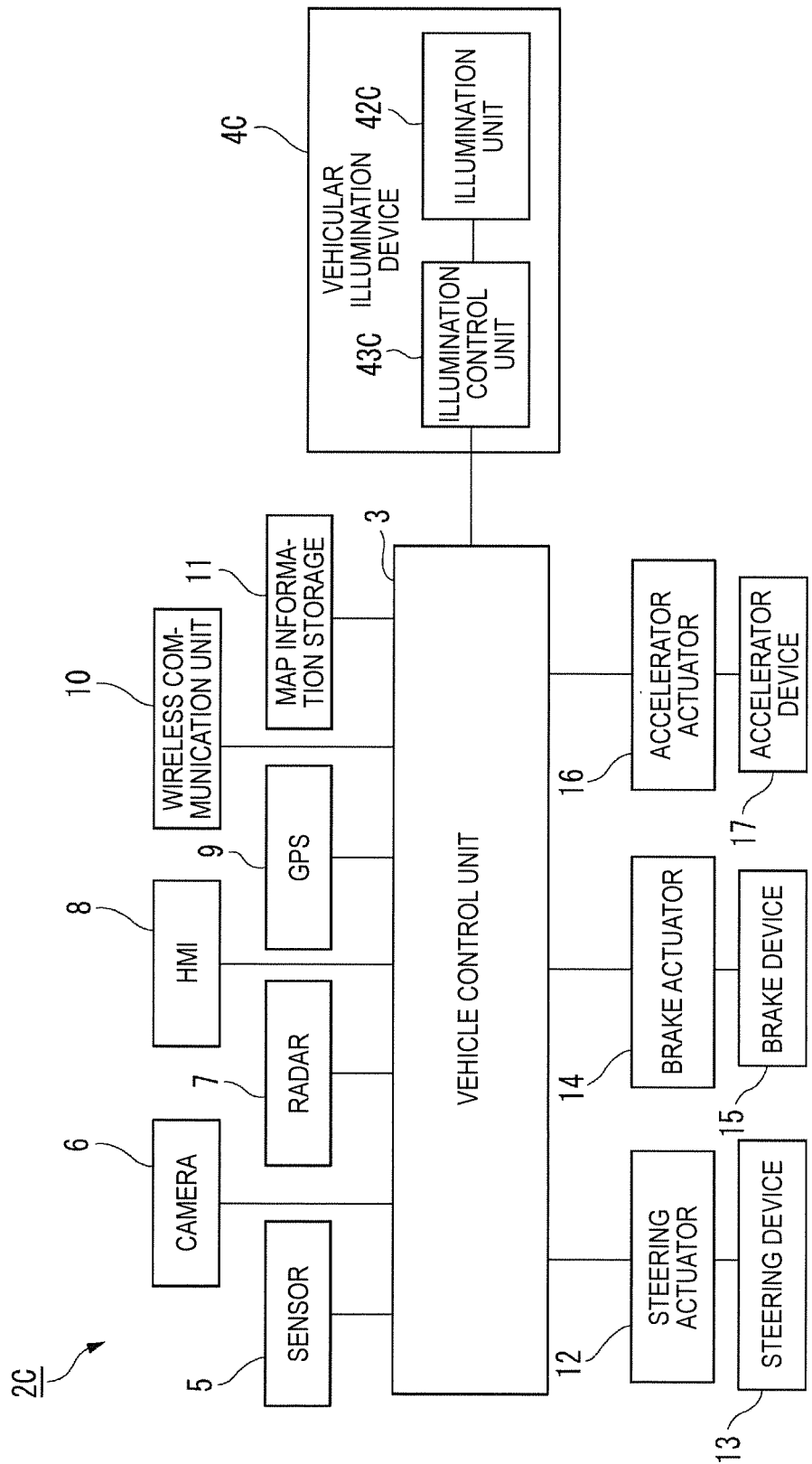
FIG. 8 is a block diagram of a vehicle system including a vehicular illumination device in accordance with a second illustrative embodiment of the present invention (hereinafter, simply referred to as a "second illustrative embodiment").
Figure 9:
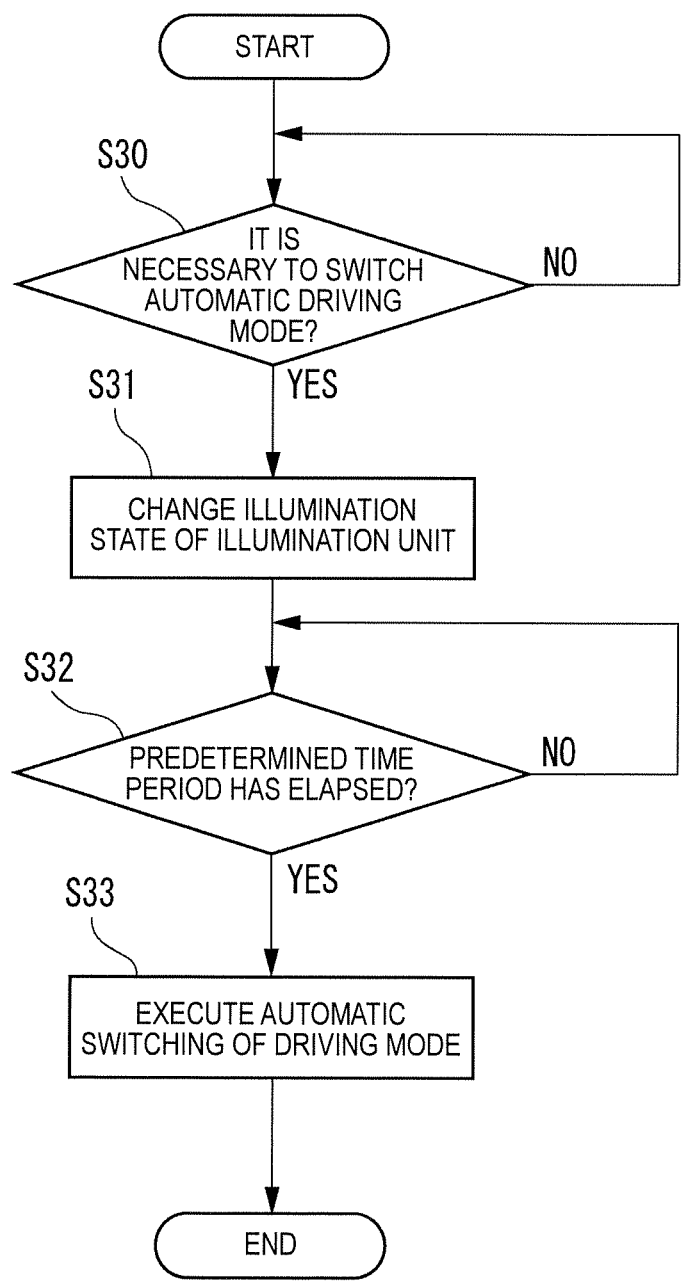
FIG. 9 is a flowchart depicting processing of changing an illumination state of the illumination unit before a driving mode of the vehicle is automatically switched.

Hereinafter, a second illustrative embodiment is described with reference to FIGS. 8 and 9. Meanwhile, for the sake of convenience of description, the description of members having the same reference numerals as those already described in the description of the first illustrative embodiment will be omitted. Further, for the sake of convenience of description, dimensions of the respective members shown in the drawings may be different from actual dimensions of the respective members.

A vehicle system 2C of a vehicle is described with reference to FIG. 8. In the meantime, the vehicle including the vehicle system 2C is not shown. FIG. 8 is a block diagram of the vehicle system 2C including a vehicular illumination device 4C (hereinafter, referred to as 'illumination device 4C') in accordance with the second illustrative embodiment. As shown in FIG. 8, the vehicle system 2C includes the vehicle control unit 3, the illumination device 4C, the sensor 5, the camera 6, the radar 7, the HMI 8, the GPS 9, the wireless communication unit 10, and the map information storage 11. Also, the vehicle system 2C includes the steering actuator 12, the steering device 13, the brake actuator 14, the brake device 15, the accelerator actuator 16, and the accelerator device 17.

The illumination device 4C includes an illumination unit 42C and an illumination control unit 43C. The illumination unit 42C includes one or more light emitting elements such as LEDs or laser, and is configured to irradiate light toward the passenger (particularly, the driver) in the vehicle. An arrangement position of the illumination unit 42C is not particularly limited inasmuch as the illumination unit 42C can irradiate the light toward at least the driver. The illumination unit 42C may be arranged on a ceiling of the vehicle, as a room lamp, for example. Also, the illumination unit 42C may be arranged at a steering wheel or a dashboard. Also, the illumination unit 42C may be arranged on the front window of the vehicle or in the vicinity thereof, as a head up display.

The illumination control unit 43C is configured by an electronic control unit (ECU), and is configured to set an illumination state (lighting/lights-out, a illumination color, a light emitting area, a blinking cycle, a luminescence intensity and the like) of the illumination unit 42C to a predetermined illumination state. For example, in the above case, the illumination control unit 43C may turn on or off the illumination unit 42C. Alternatively, the illumination control unit 43C may set an illumination color of the illumination unit 42C to a predetermined illumination color (for example, white, green, blue or the like). Also, the illumination control unit 43C may set a light emitting area of the illumination unit 42C to a predetermined light emitting area (for example, a half of a volume of the illumination unit 42C is set as the light emitting area). Also, the illumination control unit 43C may set a blinking cycle of the illumination unit 42C to a predetermined blinking cycle T. Also, the illumination control unit 43C may set a luminescence intensity of the illumination unit 42C to a predetermined luminescence intensity I.

Specifically, the vehicle control unit 3 is configured to generate a switching advance-notice signal, which indicates that the driving mode of the vehicle is to be automatically switched, and to transmit the switching advance-notice signal to the illumination control unit 43C before the driving mode of the vehicle is automatically switched. The illumination control unit 43C is configured to set an illumination state of the illumination unit 42C to a predetermined illumination state, based on the received switching advance-notice signal. In the meantime, the illumination control unit 43C and the vehicle control unit 3 are provided as separate components but may be integrally configured.

Subsequently, processing of changing the illumination state of the illumination unit 42C before the driving mode of the vehicle is automatically switched is described with reference to FIG. 9.

First, the vehicle control unit 3 determines whether it is necessary to automatically switch the driving mode of the vehicle (step S30). For example, as described above, when the vehicle that is traveling in the automatic driving mode enters a travel-prohibited section (for example, a predetermined general road) in which the automatic driving vehicle is prohibited from traveling from a travel-allowed section (for example, a predetermined highway) in which the automatic driving vehicle is allowed to travel, the vehicle control unit 3 determines that it is necessary to switch the driving mode of the vehicle from the automatic driving mode to the manual driving mode.

Then, when it is determined that it is necessary to automatically switch the driving mode of the vehicle (YES in step S30), the vehicle control unit 3 generates a switching advance-notice signal, which indicates that the driving mode of the vehicle is to be automatically switched, and transmits the switching advance-notice signal to the illumination control unit 43C. Then, the illumination control unit 43C changes the illumination state of the illumination unit 42C (lighting/lights-out, the illumination color, the light emitting area, the blinking cycle, the luminescence intensity and the like), based on the switching advance-notice signal (step S31). Particularly, the illumination control unit 43C sets the illumination state of the illumination unit 42C to a predetermined illumination state, based on the switching advance-notice signal. On the other hand, when it is determined that it is not necessary to automatically switch the driving mode of the vehicle (NO in step S30), the vehicle control unit 3 stands by.

Then, in step S32, the vehicle control unit 3 determines whether a predetermined time period has elapsed after the illumination control unit 43C has changed the illumination state of the illumination unit 42C. When it is determined that the predetermined time period has elapsed (YES in step S32), the vehicle control unit 3 executes automatic switching of the driving mode of the vehicle (step S33). Meanwhile, although the illumination control unit 43C determines in step S32 whether the predetermined time period has elapsed, the illumination control unit 43C may determine whether the driver is in a state where the driver can cope with the automatic switching of the driving mode, based on an output signal to be output from a seating sensor, a face direction sensor and the like. In this case, when it is determined that the driver can cope with the automatic switching of the driving mode, the illumination control unit 43C may execute the automatic switching of the driving mode of the vehicle. In this way, the series of processing is over.

According to the illumination device 4C of the second illustrative embodiment, the illumination control unit 43C is configured to set the illumination state of the illumination unit 42C to the predetermined illumination state, before the driving mode of the vehicle is switched. Accordingly, the driver and the like in the vehicle can correctly perceive the automatic switching of the driving mode of the vehicle by seeing the illumination state of the illumination unit 42C, before the driving mode of the vehicle is automatically switched. In this way, it is possible to prevent a situation in which the surprise event associated with the automatic switching of the driving mode of the vehicle is applied to the driver and the like in the vehicle.

Meanwhile, in the second illustrative embodiment, when the driving mode of the vehicle is automatically switched among the four driving mode (the full-automatic driving mode, the advanced driving support mode, the driving support mode, and the manual driving mode), the illumination control unit 43C may set the illumination state of the illumination unit 42C to the predetermined illumination state, based on the switching advance-notice signal.

Also, in the second illustrative embodiment, when the driving mode of the vehicle is automatically switched between the automatic driving mode (including the full-automatic driving mode, the advanced driving support mode and the driving support mode) and the manual driving mode, the illumination control unit 43C may set the illumination state of the illumination unit 42C to the predetermined illumination state, based on the switching advance-notice signal. In this case, before the driving mode of the vehicle is automatically switched between the automatic driving mode and the manual driving mode, the driver and the like can correctly perceive the automatic switching of the driving mode of the vehicle. For example, when the driving mode of the vehicle that is traveling in the automatic driving mode is automatically switched to the manual driving mode due to any reason (for example, a failure of an on-board device such as a sensor), the driver and the like can correctly perceive the automatic switching of the driving mode of the vehicle by seeing the illumination state of the illumination unit 42C. Particularly, in the automatic driving mode, the vehicle control unit 3 automatically controls at least a part of the traveling of the vehicle. However, in the manual driving mode, the vehicle control unit 3 does not automatically control the traveling of the vehicle. Accordingly, it is very beneficial to the driver if it is possible to perceive in advance that the driving mode of the vehicle is to be automatically switched between the automatic driving mode and the manual driving mode.

Also, in the second illustrative embodiment, when the driving mode of the vehicle is automatically switched between the full-automatic driving mode or the advanced driving support mode and the driving support mode or the manual driving mode, the illumination control unit 43C may set the illumination state of the illumination unit 42C to the predetermined illumination state, based on the switching advance-notice signal. In this case, when the driving mode of the vehicle is automatically switched between the full-automatic driving mode/the advanced driving support mode and the driving support mode/the manual driving mode, the driver and the like can correctly perceive the automatic switching of the driving mode of the vehicle. For example, when the driving mode of the vehicle that is traveling in the full-automatic driving mode is automatically switched to the manual driving mode due to any reason, the driver and the like can correctly perceive in advance the automatic switching of the driving mode of the vehicle by seeing the illumination state of the illumination unit 42C. Particularly, in the full-automatic driving mode and the advanced driving support mode, the driver does not control the traveling of the vehicle. However, in the driving support mode and the manual driving mode, it is necessary for the driver to control the traveling of the vehicle. Accordingly, it is very beneficial to the driver if it is possible to perceive in advance that the driving mode of the vehicle is to be automatically switched between the full-automatic driving mode/the advanced driving support mode and the driving support mode/the manual driving mode.

Also, as an example of the change in the illumination state of the illumination unit 42C, when the driving mode of the vehicle is automatically switched, the illumination control unit 43C may turn on the illumination unit 42C. In this case, the driver and the like can perceive in advance the automatic switching of the driving mode of the vehicle by seeing the lighting state of the illumination unit 42C. To the contrary, the illumination unit 42C is turned on in a usual state, and when the driving mode of the vehicle is automatically switched, the illumination control unit 43C may turn off the illumination unit 42C. In this case, the driver and the like can perceive in advance the automatic switching of the driving mode of the vehicle by seeing the lights-out state of the illumination unit 42C.

Also, as another example of the change in the illumination state of the illumination unit 42C, the illumination control unit 43C may set an illumination color, a light emitting area, a blinking cycle or a luminescence intensity of the illumination unit 42C to a predetermined illumination color, light emitting area, blinking cycle or luminescence intensity. The driver and the like can perceive in advance the automatic switching of the driving mode of the vehicle by seeing the predetermined illumination color, light emitting area, blinking cycle or luminescence intensity of the illumination unit 42C.

Also, in the second illustrative embodiment, the illumination control unit 43C is configured to set the illumination state of the illumination unit 42C to the predetermined illumination state on the basis of the switching advance-notice signal, before the driving mode of the vehicle is automatically switched. Thereby, the driver and the like in the vehicle can perceive in advance the automatic switching of the driving mode of the vehicle by seeing the illumination state of the illumination unit 42C. Instead of this configuration or in addition to this configuration, a speaker control unit (not shown) may be configured to control a speaker (not shown) so that an advance-notice sound is to be output from the speaker, based on the switching signal, before the driving mode of the vehicle is switched. Thereby, the driver and the like can perceive in advance the automatic switching of the driving mode of the vehicle by the illumination state of the illumination unit 42C and/or the advance-notice sound from the speaker.

Also, in the second illustrative embodiment, the automatic switching of the driving mode of the vehicle is premised. However, in the illumination device relating to the second illustrative embodiment, the illumination control unit 43C may be configured to set the illumination state of the illumination unit 42C to the predetermined illumination state after the driving mode of the vehicle is manually switched by a driver's operation on a driving mode change-over switch. Thereby, the driver can securely perceive that the driving mode of the vehicle has been switched by seeing the illumination state of the illumination unit 42C.

In the second illustrative embodiment, as an example of the change in the illumination state of the illumination unit 42C, the changes in lighting/lights-out/light emitting area/illumination color/blinking cycle/luminescence intensity of the illumination unit 42C have been respectively described. However, the change in the illumination state is not limited thereto. That is, it is possible to apply a variety of changes in the illumination state inasmuch as it is possible to change the illumination state of the illumination unit 42C in accordance with the driving mode of the vehicle 1. For example, it is possible to change the illumination state of the illumination unit 42C by combining the lighting/lights-out/light emitting area/illumination color/blinking cycle/luminescence intensity of the illumination unit 42C.

Also, the illumination control unit 43C may be configured to predict a lifetime of the illumination unit 42C, based on a current value and a voltage value of a lighting control circuit configuring the illumination control unit 43C and a temperature and a humidity inside the illumination unit 42C, and to change the illumination state (lighting/lights-out/light emitting area/illumination color/blinking cycle/luminescence intensity) of the illumination unit 43C, based on the predicted lifetime of the illumination unit 42C.

For example, when it is predicted that the predicted lifetime of the illumination unit 42C is short (for example, the predicted lifetime is 100 hours or shorter), the illumination control unit 43C may set the illumination color of the illumination unit 42C to a first illumination color (for example, red). Also, when the predicted lifetime of the illumination unit 42C is within a predetermined range (for example, the predicted lifetime is in the range of 100 hours to 500 hours), the illumination control unit 43C may set the illumination color of the illumination unit 42C to a second illumination color (for example, yellow). Also, when it is predicted that the predicted lifetime of the illumination unit 42C is long (for example, the predicted lifetime is 500 hours or longer), the illumination control unit 43C may set the illumination color of the illumination unit 42C to a third illumination color (for example, green). Meanwhile, instead of the illumination control unit 43C, the vehicle control unit 3 may be configured to predict the lifetime of the illumination unit 42C. In this case, the illumination control unit 43C may be configured to receive data indicative of the predicted lifetime of the illumination unit 42C from the vehicle control unit 3 and then to change the illumination state of the illumination unit 42C, based on the received data.

Here, a temperature sensor configured to measure the internal temperature of the illumination unit 42C and a humidity sensor configured to measure the internal humidity of the illumination unit 42C may be provided inside the illumination unit 42C.

Subsequently, an example of predicting the lifetime of the illumination unit 42C (in particular, the light emitting element provided in the illumination unit 42C) on the basis of the internal temperature of the illumination unit 42C is described below. In this case, a lifetime prediction formula indicative of a relationship between a use time t of the light emitting element and a luminance L of the light emitting element may be stored in the memory of the illumination control unit 43C. The illumination control unit 43C may be configured to determine the predicted lifetime of the illumination unit 42C, based on the lifetime prediction formula and the current luminance L of the light emitting element. Also, the lifetime prediction formula stored in the memory may be acquired from a server arranged on a communication network via the wireless communication unit 10. In this case, the illumination control unit 43C may be configured to periodically acquire the updated lifetime prediction formula from the server arranged on the communication network. For example, when the lifetime prediction formula stored in the memory is a lifetime prediction formula based on the indoor temperature of 30° C. and the internal temperature of the illumination unit 42C acquired from the temperature sensor is 50° C., the illumination control unit 43C may acquire a lifetime prediction formula based on the indoor temperature of 50° C. from the server and then determine the predicted lifetime of the illumination unit 42C on the basis of the acquired lifetime prediction formula based on the indoor temperature of 50° C. and the current luminance L of the light emitting element. In this way, a suitable lifetime prediction formula can be acquired via the communication network, so that the lifetime of the illumination unit 42C can be predicted more accurately. Also, since the illumination control unit 43C is configured to change the illumination state of the illumination unit 42C in accordance with the predicted lifetime of the illumination unit 42C, it is possible to present the information relating to the lifetime of the illumination unit 42C toward the passenger in the vehicle. In this way, the passenger can perceive the lifetime of the illumination unit 42C by visually recognizing the illumination state of the illumination unit 42C.

Also, the illumination control unit 43C may be configured to change the illumination state of the illumination unit 42C (lighting/lights-out/light emitting area/illumination color/ blinking cycle/luminescence intensity), based on a current condition of a driver. For example, in a case where one of the plurality of cameras 6 is configured to capture the driver, the vehicle control unit 3 may acquire the captured image of the driver from the camera 6 and then determine the current condition of the driver, based on the acquired captured image and a face recognition algorithm. Here, when it is determined that the driver cannot drive (for example, when it is determined that the driver is dozing), the vehicle control unit 3 generates a predetermined illumination control signal and then transmits the predetermined illumination control signal to the illumination control unit 43C. The illumination control unit 43C may set the illumination color of the illumination unit 42 to a predetermined illumination color (for example, red), based on the predetermined illumination control signal. In this way, it is possible to present the information relating to the current condition of the driver toward the passenger in the vehicle.

Third Illustrative Embodiment

Hereinafter, a third illustrative embodiment is described with reference to FIGS. 10A to 12. Meanwhile, in the below, for the sake of convenience of description, the description of members having the same reference numerals as those already described in the description of the first and second illustrative embodiments will be omitted.

Figure 10A:
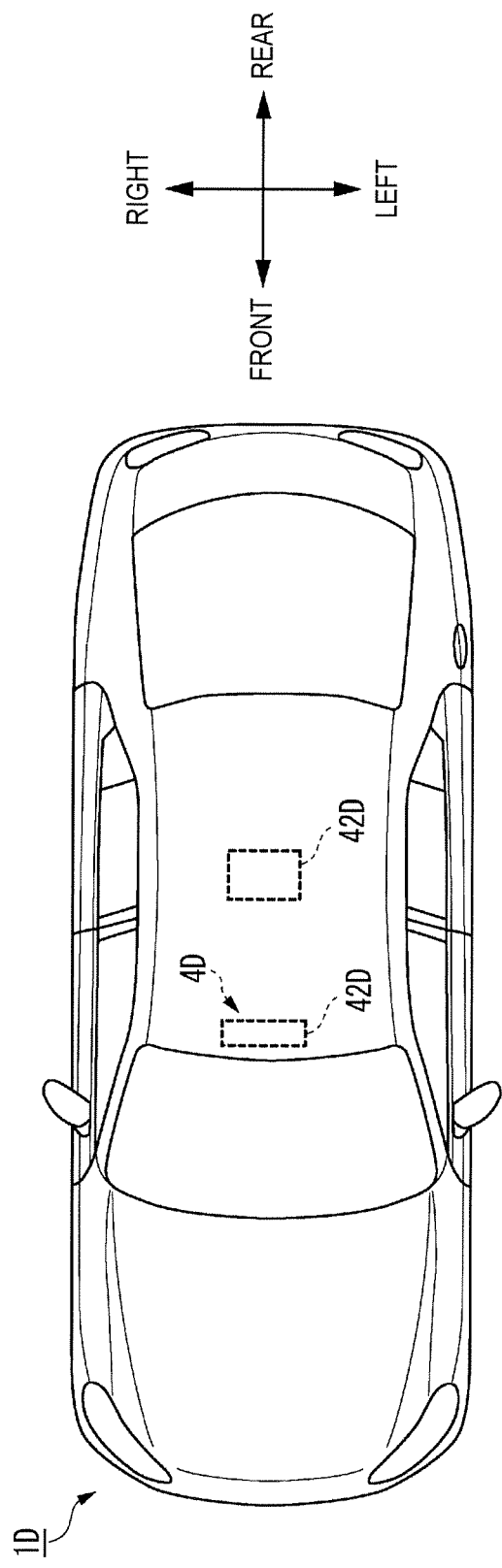
FIG. 10A is a top view of a vehicle to which a vehicular illumination device in accordance with a third illustrative embodiment of the present invention (hereinafter, simply referred to as a "third illustrative embodiment") is mounted.
Figure 10B:
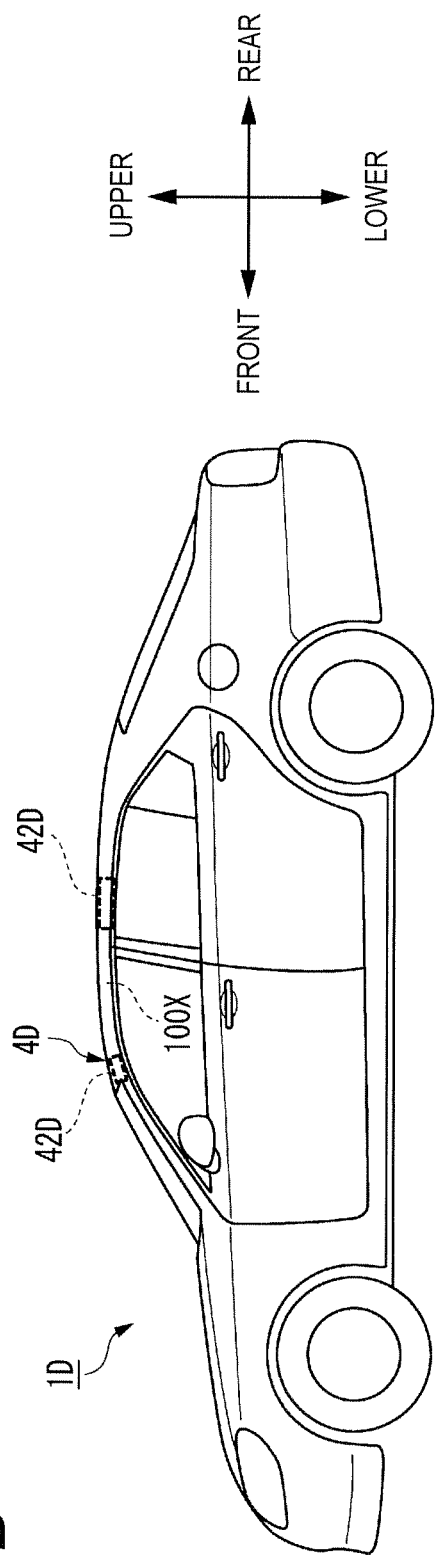
FIG. 10B is a side view of the vehicle of FIG. 10A.

FIGS. 10A-10B depict a vehicle 1D to which a vehicular illumination device 4D (hereinafter, referred to as 'illumination device 4D') of the third illustrative embodiment is mounted. FIG. 10A is a top view of the vehicle 1D, and FIG. 10B is a side view of the vehicle 1D. The vehicle 1D is an automobile capable of traveling in the automatic driving mode, and includes an illumination device 4D. The illumination device 4D includes an illumination unit 42D and an illumination control unit 43D (refer to FIG. 11), and the illumination unit 42D of the illumination device 4D is mounted on a ceiling 100X of the vehicle 1D so as to irradiate the light toward the passenger (refer to FIGS. 10A-10B). Here, the ceiling 100X indicates a vehicle interior ceiling and is different from the vehicle body roof exposed to the outside. The illumination unit 42D may be configured to function as a room lamp, for example. The number, position and shape of the illumination unit 42D are not particularly limited, and the illumination unit 42D has only to be configured to irradiate the light toward the passenger (according to one or more embodiments, all the passengers).

Figure 11:
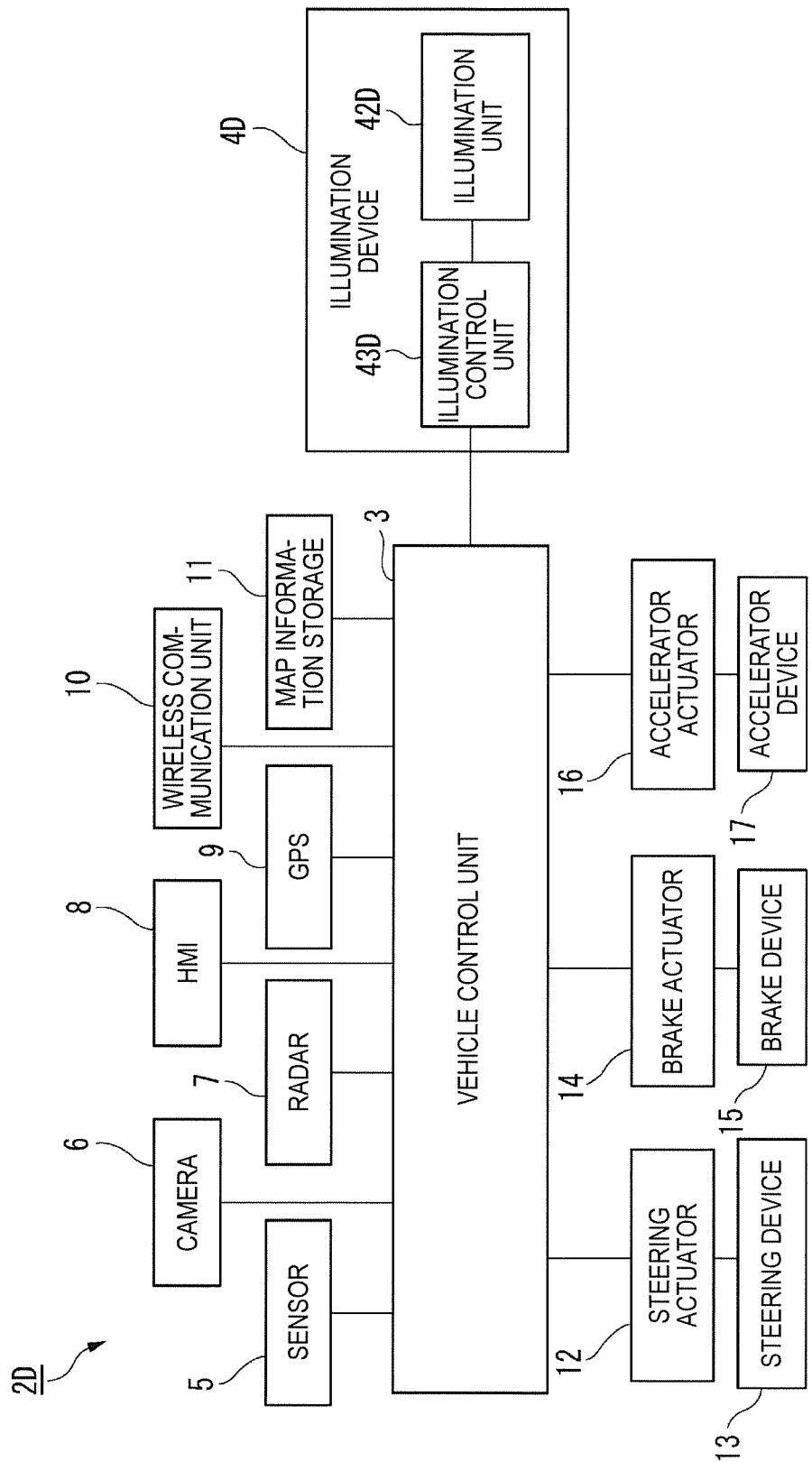
FIG. 11 is a block diagram of a vehicle system including the vehicular illumination device in accordance with the third illustrative embodiment.

Subsequently, a vehicle system 2D of the vehicle 1D is described with reference to FIG. 11. FIG. 11 is a block diagram of the vehicle system 2D. As shown in FIG. 11, the vehicle system 2D includes the vehicle control unit 3, the illumination device 4D, the sensor 5, the camera 6, the radar 7, the HMI 8, the GPS 9, the wireless communication unit 10, and the map information storage 11. Also, the vehicle system 2D includes the steering actuator 12, the steering device 13, the brake actuator 14, the brake device 15, the accelerator actuator 16, and the accelerator device 17.

As described above, the illumination device 4D includes the illumination unit 42D and the illumination control unit 43D. The illumination unit 42D includes one or more light emitting elements such as LEDs (Light Emitting Diode) and laser, and is configured to irradiate the light toward the passenger. The illumination control unit 43D is configured by an electronic control unit (ECU), and is configured to change the illumination state of the illumination unit 42D (lighting/lights-out, the illumination color, the luminescence intensity, the light emitting area, the blinking cycle and the like) in accordance with a driving mode (which will be described later) of the vehicle 1D. Specifically, the vehicle control unit 3 is configured to generate a mode signal indicative of the driving mode of the vehicle 1D and to transmit the mode signal to the illumination control unit 43D. The illumination control unit 43D is configured to change the illumination state of the illumination unit 42D, based on the received mode signal. In the meantime, the illumination control unit 43D and the vehicle control unit 3 are provided as separate components but may be integrally configured.

Figure 12:
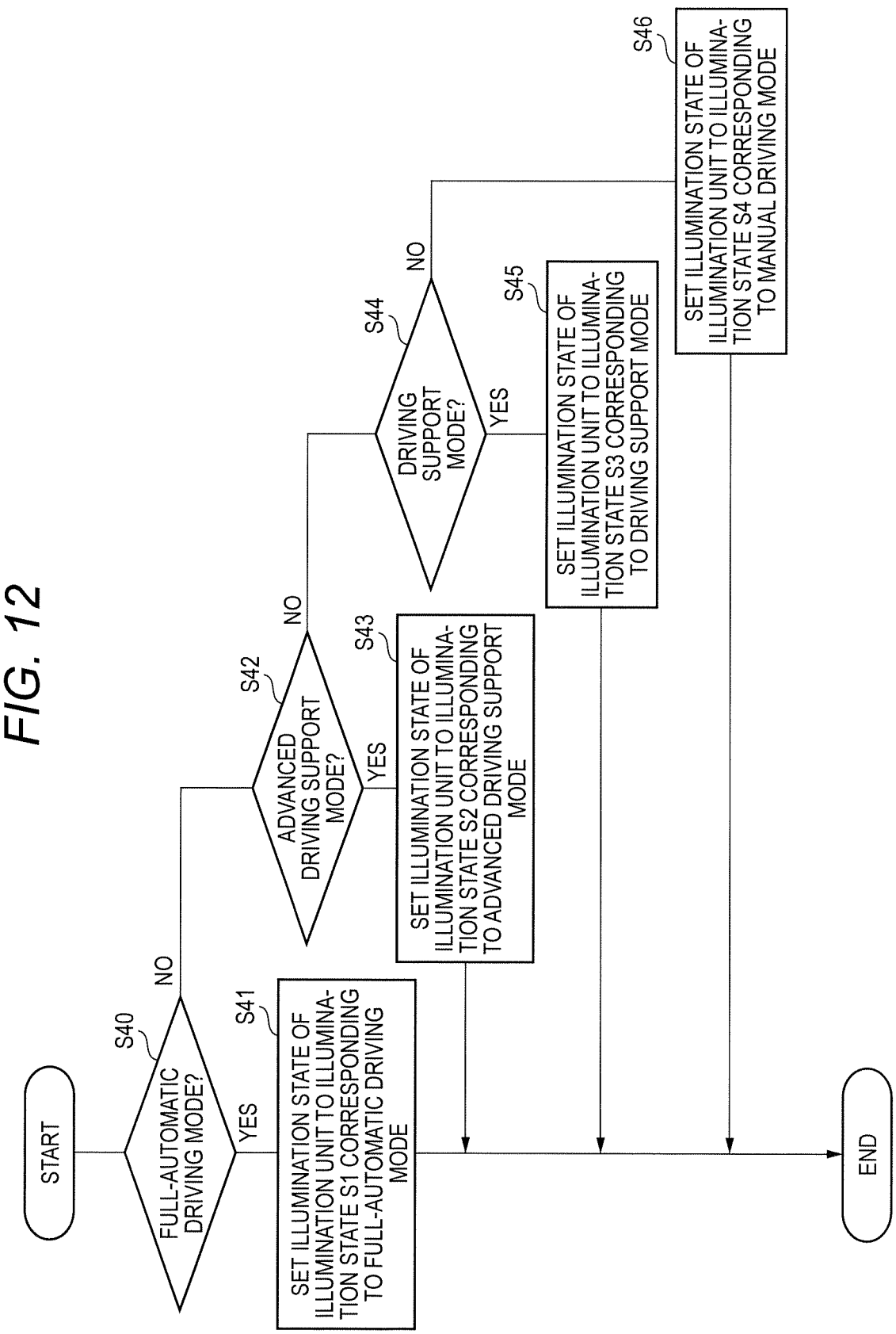
FIG. 12 is a flowchart depicting processing of changing an illumination state of the illumination unit in accordance with a driving mode of the vehicle.

Subsequently, processing of changing the illumination state of the illumination unit 42D in accordance with the driving mode of the vehicle 1D is described with reference to FIG. 12. First, the illumination control unit 43D receives a mode signal indicative of the driving mode of the vehicle 1D from the vehicle control unit 3. Then, the illumination control unit 43D determines whether the received mode signal indicates the full-automatic driving mode (step S40). When it is determined that the mode signal indicates the full-automatic driving mode (YES in step S40), the illumination control unit 43D sets the illumination state of the illumination unit 42D to an illumination state S1 corresponding to the full-automatic driving mode (step S41).

On the other hand, when it is determined that the mode signal does not indicate the full-automatic driving mode (NO in step S40), the illumination control unit 43D determines whether the mode signal indicates the advanced driving support mode (step S42). When it is determined that the mode signal indicates the advanced driving support mode (YES in step S42), the illumination control unit 43D sets the illumination state of the illumination unit 42D to an illumination state S2 corresponding to the advanced driving support mode (step S43).

On the other hand, when it is determined that the mode signal does not indicate the advanced driving support mode (NO in step S42), the illumination control unit 43D determines whether the mode signal indicates the driving support mode (step S44). When it is determined that the mode signal indicates the driving support mode (YES in step S44), the illumination control unit 43D sets the illumination state of the illumination unit 42D to an illumination state S3 corresponding to the driving support mode (step S45).

On the other hand, when it is determined that the mode signal does not indicate the driving support mode (NO in step S44), the illumination control unit 43D determines that the mode signal indicates the manual driving mode, and sets the illumination state of the illumination unit 42D to an illumination state S4 corresponding to the manual driving mode (step S46). In this way, the processing is over. Also, whenever the illumination control unit 43D receives the mode signal from the vehicle control unit 3, the processing is executed.

Like this, according to the third illustrative embodiment, since the illumination state of the illumination unit 42D is set to the predetermined illumination state in accordance with the driving mode of the vehicle 1D, it is possible to provide the illumination device 4D capable of displaying the information indicative of the driving mode of the vehicle 1D toward the passenger in the vehicle 1D.

Also, since the illumination state of the illumination unit 42D is changed among the illumination states S1 to S4 in accordance with the driving mode of the vehicle 1D, the passenger can perceive whether the driving mode of the vehicle 1D is the full-automatic driving mode, the advanced driving support mode, the driving support mode or the manual driving mode. In this case, according to one or more embodiments, the respective illumination states S1 to S4 are the different illumination states. For example, since the illumination state of the illumination unit 42D is changed from the illumination state S2 to the illumination state S3 when the driving mode is changed from the advanced driving support mode to the driving support mode, the pedestrians, other vehicles and the like around the vehicle 1D can perceive that the driving mode of the vehicle 1D has changed from the advanced driving support mode to the driving support mode.

<Change in Illumination State: Lighting/Lights-Out of Illumination Unit 42D>

Subsequently, as an example of changing the illumination state of the illumination unit 42D, an example where the illumination control unit 43D turns on and off the illumination unit 42D is described. First, a case (hereinafter, referred to as "Case 1") where the illumination control unit 43D turns on the illumination unit 42D when the driving mode of the vehicle 1D is the full-automatic driving mode is described. In this case, the illumination control unit 43D turns on the illumination unit 42D in the illumination state S1 shown in FIG. 12 and turns off the illumination unit 42D in the illumination states S2 to S4. In Case 1, the passenger can perceive that the driving mode of the vehicle 1D is the full-automatic driving mode.

Subsequently, a case (Case 2) where the illumination control unit 43D turns on the illumination unit 42D when the driving mode of the vehicle 1D is the full-automatic driving mode or the advanced driving support mode is described. In this case, the illumination control unit 43D turns on the illumination unit 42D in the illumination states S1 and S2 and turns off the illumination unit 42D in the illumination states S3 and S4. In Case 2, the passenger can perceive that the driving mode of the vehicle 1D is the full-automatic driving mode or the advanced driving support mode.

Also, a case (Case 3) where the illumination control unit 43D turns on the illumination unit 42D when the driving mode of the vehicle 1D is the full-automatic driving mode, the advanced driving support mode or the driving support mode is described. In this case, the illumination control unit 43D turns on the illumination unit 42D in the illumination states S1 to S3 and turns off the illumination unit 42D in the illumination state S4. In Case 3, the passenger can perceive that the driving mode of the vehicle 1D is the full-automatic driving mode, the advanced driving support mode or the driving support mode (i.e., the automatic driving mode). In other words, the passenger can perceive that the driving mode of the vehicle 1D is the automatic driving mode.

The lighting/lights-out states of the illumination states S1 to S4 in each of Cases 1 to 3 are summarized in a following table.

TABLE 1

|  | Case 1 | Case 2 | Case 3 |
| --- | --- | --- | --- |
| Illumination State S1 | Lighting | Lighting | Lighting |
| Illumination State S2 | Lights-out | Lighting | Lighting |
| Illumination State S3 | Lights-out | Lights-out | Lighting |
| Illumination State S4 | Lights-out | Lights-out | Lights-out |

Meanwhile, in Case 1, the illumination control unit 43D turns on the illumination unit 42D in the illumination state S1 and turns off the illumination unit 42D in the illumination states S2 to S4. However, to the contrary, the illumination control unit 43D may turn off the illumination unit 42D in the illumination state S1 and turn on the illumination unit 42D in the illumination states S2 to S4. Also in this case, the passenger can perceive that the driving mode of the vehicle 1D is the full-automatic driving mode. Similarly, in Case 2, the illumination control unit 43D may turn off the illumination unit 42D in the illumination states S1 and S2 and turn on the illumination unit 42D in the illumination states S3 and S4. Also in Case 3, the illumination control unit 43D may turn off the illumination unit 42D in the illumination states S1 to S3 and turn on the illumination unit 42D in the illumination state S4. Also in these cases, it is possible to obtain the same effects as described above. Also, according to one or more embodiments, the illumination color of the illumination unit 42D is green when the illumination unit 42D is turned on.

<Change in Illumination State: Light Emitting Area of Illumination Unit 42D>

Subsequently, as another example of changing the illumination state of the illumination unit 42D, an example where the illumination control unit 43D changes the light emitting area of the illumination unit 42D is described. It is assumed that the illumination unit 42D has three light emitting areas. In this example, light emitting elements (not shown) such as LEDs that are independently turned on and off are arranged in each of the light emitting areas.

In this case, the illumination control unit 43D may turn on all the light emitting areas in the illumination state S1, turn on the two light emitting areas in the illumination state S2, turn on one light emitting area in the illumination state S3, and turn off all the light emitting areas in the illumination state S4. In this way, the light emitting area of the illumination unit 42D is different in each of the illumination states S1 to S4.

According to the above configuration, since the light emitting area of the illumination unit 42D is changed in accordance with the automatic driving mode of the vehicle 1D, it is possible to provide the illumination device 4D capable of displaying the information indicative of the driving mode of the vehicle 1D toward the passenger. In the meantime, the change in the light emitting area is merely an example. An example where the light emitting area is variously changed can be applied, inasmuch as the light emitting area of the illumination unit 42D is changed in accordance with the automatic driving mode of the vehicle 1D.

<Change in Illumination State: Illumination Color of Illumination Unit 42D>

Subsequently, as another example of changing the illumination state of the illumination unit 42D, an example where the illumination control unit 43D changes the illumination color of the illumination unit 42D is described. In this example, a plurality of (for example, three) light emitting elements (not shown) such as LEDs is arranged in the illumination unit 42D, and the light emitted from each light emitting element has a different light emitting color.

In this case, the illumination control unit 43D may set the illumination color of the illumination unit 42D to white in the illumination state S1, set the illumination color of the illumination unit 42D to green in the illumination state S2, set the illumination color of the illumination unit 42D to blue in the illumination state S3, and set the illumination color of the illumination unit 42D to red or turn off the illumination unit 42 (the illumination color is black) in the illumination state S4. In this way, the illumination color of the illumination unit 42D is different in each of the illumination states S1 to S4.

In this way, since the illumination color of the illumination unit 42D is changed in accordance with the driving mode of the vehicle 1D, it is possible to provide the illumination device 4D capable of displaying the information indicative of the driving mode of the vehicle 1D toward the passenger. In the meantime, the change in the illumination color is merely an example. An example where the illumination color is variously changed can be applied, inasmuch as the illumination color of the illumination unit 42D is changed in accordance with the driving mode of the vehicle 1D.

<Change in Illumination State: Blinking Cycle of Illumination Unit 42D>

Also, as another example of changing the illumination state of the illumination unit 42D, the illumination control unit 43D may change a blinking cycle (strictly speaking, a blinking cycle of the light emitted from the illumination unit 42D) of the illumination unit 42D. At this time, the illumination control unit 43D may set the blinking cycle of the illumination unit 42 to T1 in the illumination state S1, set the blinking cycle of the illumination unit 42 to T2 in the illumination state S2, set the blinking cycle of the illumination unit 42 to T3 in the illumination state S3, and set the blinking cycle of the illumination unit 42 to T4 in the illumination state S4.

<Change in Illumination State: Luminescence Intensity of Illumination Unit 42D>

Also, as another example of changing the illumination state of the illumination unit 42D, the illumination control unit 43D may change the luminescence intensity of the illumination unit 42D. At this time, the illumination control unit 43D may set the luminescence intensity of the illumination unit 42D to I1 in the illumination state S1, set the luminescence intensity of the illumination unit 42D to I2 in the illumination state S2, set the luminescence intensity of the illumination unit 42D to I3 in the illumination state S3, and set the luminescence intensity of the illumination unit 42D to I4 in the illumination state S4.

In the third illustrative embodiment, as an example of the change in the illumination state of the illumination unit 42D, the changes in the lighting/lights-out, the light emitting area, the illumination color, the blinking cycle and the luminescence intensity of the illumination unit 42D have been described, respectively. However, the change in the illumination state is not limited thereto. Various changes in the illumination state can be applied, inasmuch as the illumination state of the illumination unit 42D can be changed in accordance with the driving mode of the vehicle 1D. For example, the illumination state of the illumination unit 42D may be changed by combining the lighting/lights-out, the light emitting area, the illumination color, the blinking cycle and the luminescence intensity of the illumination unit 42D.

Also, like the second illustrative embodiment, the illumination control unit 43D 43 may be configured to change the illumination state (lighting/lights-out/light emitting area/illumination color/blinking cycle/luminescence intensity) of the illumination unit 42D, based on the predicted lifetime of the illumination unit 42D. Also, the illumination control unit 43D may be configured to change the illumination state of the illumination unit 42D, based on a current condition of the driver. Also, the information indicative of the driving mode of the vehicle 1D may be presented to the passenger in the vehicle by using a speaker.

Although the illustrative embodiments of the present invention have been described, it should be noted that the technical scope of the present invention is not to be interpreted limitedly by the description of the illustrative embodiments. It will be understood by one skilled in the art that the illustrative embodiments are merely exemplary and a variety of changes to the illustrative embodiments can be made within the scope of the invention defined in the claims.

The technical scope of the present invention should be determined on the basis of the scope of the invention defined in the claims and its equivalent scope.

In each of the illustrative embodiments, the driving mode of the vehicle includes the full-automatic driving mode, the advanced driving support mode, the driving support mode, and the manual driving mode. However, the driving mode of the vehicle should not be limited to the four modes. The classification of the driving modes of the vehicle may be appropriately changed in accordance with the laws and regulations pertaining to the automatic driving in each country. Likewise, the definitions of "the full-automatic driving mode," "the advanced driving support mode," and "the driving support mode" described in the illustrative embodiments are merely examples, and the definitions may be appropriately changed in accordance with the laws and regulations pertaining to the automatic driving in each country.

Also, in each illustrative embodiment, the illumination control unit may be configured to set the illumination state of the illumination unit to a predetermined illumination state, in accordance with following information.

Information indicative of the transition state of the driving mode of the vehicle Information indicating that the vehicle is travelling in the full-automatic driving mode in a state where there is no passenger on a driver seat of the vehicle Information indicating that the vehicle is travelling in the full-automatic driving mode in a state where there is a passenger in the vehicle Stop advance-notice information for giving advance notice of stop of the vehicle Information indicating that the automatic driving control of the vehicle is in an abnormal state Information indicating whether it is possible to get in the vehicle travelling in the full-automatic driving mode Information indicative of the abnormality of a component (brake, tire, etc.) of the vehicle Information indicating whether the vehicle is connected to a communication network Information indicative of the abnormality of a camera, a radar, and the like Information indicative of abnormality in a passenger's vital sign Information indicative of a capacity of a battery mounted on the vehicle

The invention claimed is:

1. A vehicular illumination device provided to a vehicle capable of travelling in an automatic driving mode, the vehicular illumination device comprising:
   an illumination unit configured to display, when a traveling condition of the vehicle is about to change by an amount greater than a threshold, advance-notice information for giving advance-notice of automatic traveling control of the vehicle so that a passenger in the vehicle can visually recognize the advance-notice information, and
   an illumination controller configured to control the illumination unit so that the passenger in the vehicle can visually recognize the advance-notice information before the automatic traveling control of the vehicle is executed,
   wherein the illumination unit comprises a laser scanning device that comprises a laser light source and an optical deflection device configured to deflect laser light emitted from the laser light source,
   wherein the optical deflection device comprises a movable mirror, and
   wherein the illumination unit scans the laser light to display the advance-notice information.

2. The vehicular illumination device according to claim 1, wherein the advance-notice information comprises:
   brake advance-notice information for giving advance notice of automatic brake control of the vehicle,
   accelerator advance-notice information for giving advance notice of automatic accelerator control of the vehicle, and
   steering advance-notice information for giving advance notice of automatic steering control of the vehicle.

3. The vehicular illumination device according to claim 1, wherein the illumination unit is configured to display the advance-notice information on a road surface in front of the vehicle.

4. The vehicular illumination device according to claim 1, wherein the illumination unit is configured to display the advance-notice information on a window of the vehicle.

5. A vehicle system comprising:
   the vehicular illumination device according to claim 1, and
   a vehicle controller configured to execute traveling control of the vehicle,
   wherein, when a determination is made that at least the automatic traveling control of the vehicle should be executed and the traveling condition of the vehicle is about to change by an amount greater than the threshold, the vehicle controller generates an instruction signal for instructing the advance-notice information to be displayed, and
   wherein the vehicular illumination device is configured to display the advance-notice information on the basis of the instruction signal so that a passenger in the vehicle can visually recognize the advance-notice information, before the vehicle controller executes the automatic traveling control of the vehicle.

6. A vehicular illumination device provided to a vehicle capable of traveling in an automatic driving mode, the vehicular illumination device comprising:
   an illumination unit configured to irradiate light toward at least a driver in the vehicle, and
   an illumination controller configured to set an illumination state of the illumination unit to a predetermined illumination state on the basis of a switching advance-notice signal, which indicates that a driving mode of the vehicle is to be automatically switched, before the driving mode of the vehicle is automatically switched,
   wherein the illumination unit comprises a laser scanning device that comprises a laser light source and an optical deflection device configured to deflect laser light emitted from the laser light source,
   wherein the optical deflection device comprises a movable mirror,
   wherein the illumination unit scans the laser light to display the advance-notice information.

7. The vehicular illumination device according to claim 6, wherein the illumination controller is configured to set the illumination state of the illumination unit to the predetermined illumination state on the basis of the switching advance-notice signal, before the driving mode of the vehicle is automatically switched between an automatic driving mode and a manual driving mode.

8. The vehicular illumination device according to claim 6, wherein the illumination controller is configured to set the illumination state of the illumination unit to the predetermined illumination state on the basis of the switching advance-notice signal, before the driving mode of the vehicle is automatically switched between a full-automatic driving mode or an advanced driving support mode and a driving support mode or a manual driving mode.

9. The vehicular illumination device according to claim 6, wherein the illumination controller is configured to turn on or turn off the illumination unit on the basis of the switching advance-notice signal.

10. A vehicle system comprising:
the vehicular illumination device according to claim 6, and
a vehicle controller configured to generate the switching advance-notice signal and to automatically switch the driving mode of the vehicle.

11. A vehicular illumination device configured to display information indicative of a driving mode of a vehicle toward a passenger in the vehicle capable of traveling in an automatic driving mode, the vehicular illumination device comprising:
an illumination unit mounted to a ceiling of the vehicle so as to irradiate light toward the passenger in the vehicle, and
an illumination controller configured to set an illumination state of the illumination unit to a first illumination state when the driving mode of the vehicle is a manual driving mode, and set the illumination state of the illumination unit to a second illumination state when the driving mode of the vehicle is an automatic driving mode,
wherein the illumination controller is further configured to control the illumination unit so that the passenger in the vehicle can visually recognize advance-notice information before automatic traveling control of the vehicle is executed,
wherein the advance-notice information comprises brake advance-notice information for giving advance notice of automatic brake control of the vehicle, and accelerator advance-notice information for giving advance notice of automatic accelerator control of the vehicle, and
wherein the illumination unit comprises a laser scanning device that comprises a laser light source and an optical deflection device configured to deflect laser light emitted from the laser light source,
wherein the optical deflection device comprises a movable mirror, and
wherein the illumination unit scans the laser light to display the advance-notice information.

12. The vehicular illumination device according to claim 11, wherein the illumination controller turns on or turns off the illumination unit when the driving mode of the vehicle is a predetermined driving mode.

13. The vehicular illumination device according to claim 12, wherein the illumination controller turns on or turns off the illumination unit when the driving mode of the vehicle is a full-automatic driving mode.

14. The vehicular illumination device according to claim 12, wherein the illumination controller turns on or turns off the illumination unit when the driving mode of the vehicle is a full-automatic driving mode or an advanced driving support mode.

15. The vehicular illumination device according to claim 12, wherein the illumination controller turns on or turns off the illumination unit when the driving mode of the vehicle is a full-automatic driving mode, an advanced driving support mode or a driving support mode.

16. The vehicular illumination device according to claim 10,
wherein the illumination controller sets the illumination state of the illumination unit to a first illumination state when the driving mode of the vehicle is a full-automatic driving mode,
wherein the illumination controller sets the illumination state of the illumination unit to a second illumination state when the driving mode of the vehicle is an advanced driving support mode,
wherein the illumination controller sets the illumination state of the illumination unit to a third illumination state when the driving mode of the vehicle is a driving support mode, and
wherein the illumination controller sets the illumination state of the illumination unit to a fourth illumination state when the driving mode of the vehicle is a manual driving mode.

17. The vehicular illumination device according to claim 11, wherein the illumination controller is configured to change an illumination color, a luminescence intensity, a light emitting area or a blinking cycle of the illumination unit in accordance with the driving mode of the vehicle.

18. A vehicle system comprising:
the vehicular illumination device according to claim 11, and
a vehicle controller configured to transmit a mode signal indicative of the driving mode of the vehicle to the vehicular illumination device and to control traveling of the vehicle.

19. A vehicle comprising the vehicle system according to claim 5.

* * * * *